United States Patent
Miwa et al.

(10) Patent No.: US 10,361,886 B2
(45) Date of Patent: Jul. 23, 2019

(54) APPARATUS AND METHOD FOR COLLECTIVE COMMUNICATION IN A PARALLEL COMPUTER SYSTEM

(71) Applicant: FUJITSU LIMITED, Kawasaki-shi, Kanagawa (JP)

(72) Inventors: Masahiro Miwa, Shinagawa (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 326 days.

(21) Appl. No.: 14/703,103

(22) Filed: May 4, 2015

(65) Prior Publication Data
US 2015/0334035 A1    Nov. 19, 2015

(30) Foreign Application Priority Data

May 14, 2014 (JP) .................. 2014-100569
Apr. 20, 2015 (JP) .................. 2015-085618

(51) Int. Cl.
*H04L 12/869* (2013.01)
*H04L 12/64* (2006.01)
*H04L 29/06* (2006.01)

(52) U.S. Cl.
CPC .......... *H04L 12/6418* (2013.01); *H04L 47/60* (2013.01); *H04L 65/4076* (2013.01)

(58) Field of Classification Search
None
See application file for complete search history.

(56) References Cited

U.S. PATENT DOCUMENTS

| 8,370,496 B1* | 2/2013 | Marr | H04L 67/1031 370/396 |
| 2009/0016332 A1* | 1/2009 | Aoki | G06F 15/173 370/388 |
| 2012/0140621 A1* | 6/2012 | Wu | H04L 69/163 370/230 |

FOREIGN PATENT DOCUMENTS

| JP | 11-110362 | 4/1999 |
| JP | 2009-020797 | 1/2009 |

OTHER PUBLICATIONS

Ehsan Totoni et al., "Simulation-based Performance Analysis and Tuning for a Two-level Directly Connected System", 2011 IEEE 17th International Conference on Parallel and Distributed Systems, pp. 340-347, Dec. 7, 2011.
Japanese Office Action dated Feb. 5, 2019 for corresponding Japanese Patent Application No. 2015-085618.

* cited by examiner

*Primary Examiner* — Anh Vu H Ly
*Assistant Examiner* — Hector Reyes
(74) *Attorney, Agent, or Firm* — Xsensus LLP

(57) ABSTRACT

A parallel computer system includes a plurality of network switches that are all connected to each other, and a plurality of nodes each connected to one of the plurality of network switches, where each network switch is connected to two or more nodes of the plurality of nodes. Each node determines a first destination node of data to be transmitted by the each node at a given time so that a first network switch connected to the first destination node is different from a second network switch connected to a second destination node of data transmitted by any node, other than the each node, which is connected to a network switch to which the each node is connected, and transmits data to the determined first destination node.

17 Claims, 41 Drawing Sheets

FIG. 2

| TRANSMISSION SOURCE | Leaf SWITCH 1A | | | Leaf SWITCH 2A | | | Leaf SWITCH 3A | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 1 | 2 | 3 | 4 | 5 | 6 | 7 | 8 | 0 |
| 2 | 2 | 3 | 4 | 5 | 6 | 7 | 8 | 0 | 1 |
| 3 | 3 | 4 | 5 | 6 | 7 | 8 | 0 | 1 | 2 |
| 4 | 4 | 5 | 6 | 7 | 8 | 0 | 1 | 2 | 3 |
| 5 | 5 | 6 | 7 | 8 | 0 | 1 | 2 | 3 | 4 |
| 6 | 6 | 7 | 8 | 0 | 1 | 2 | 3 | 4 | 5 |
| 7 | 7 | 8 | 0 | 1 | 2 | 3 | 4 | 5 | 6 |
| 8 | 8 | 0 | 1 | 2 | 3 | 4 | 5 | 6 | 7 |

DESTINATION OF EACH PHASE

☐ : Leaf SWITCH

▨ : Spine SWITCH

◯ : NODE

FIG. 16

| NODE NUMBER | GROUP |
|---|---|
| 0 | A |
| 1 | |
| ⋮ | |
| 8 | |
| 9 | B |
| 10 | |
| ⋮ | |
| 17 | |
| 18 | C |
| 19 | |
| ⋮ | |
| 26 | |

FIG. 17

| | | GROUP OF TRANSMISSION SOURCE NODE | | |
|---|---|---|---|---|
| | | A | B | C |
| PHASE | 0-8 | B(9) | A(0) | C(18) |
| | 9-17 | C(18) | B(9) | A(0) |
| | 18-26 | A(0) | C(18) | B(9) |

| | EXTENDED FULL MESH TOPOLOGY | TWO-LAYER FAT TREE | THREE-LAYER FAT TREE |
|---|---|---|---|
| NUMBER OF SWITCHES | $3d^2/2$ | $3d$ | $5d^2$ |
| NUMBER OF NODES | $d^3$ | $2d^2$ | $2d^3$ |
| NUMBER OF NODES PER SWITCH | $2d/3$ | $2d/3$ | $2d/5$ |
| NUMBER OF HOPS IN WORST CASE | 3 | 3 | 5 |

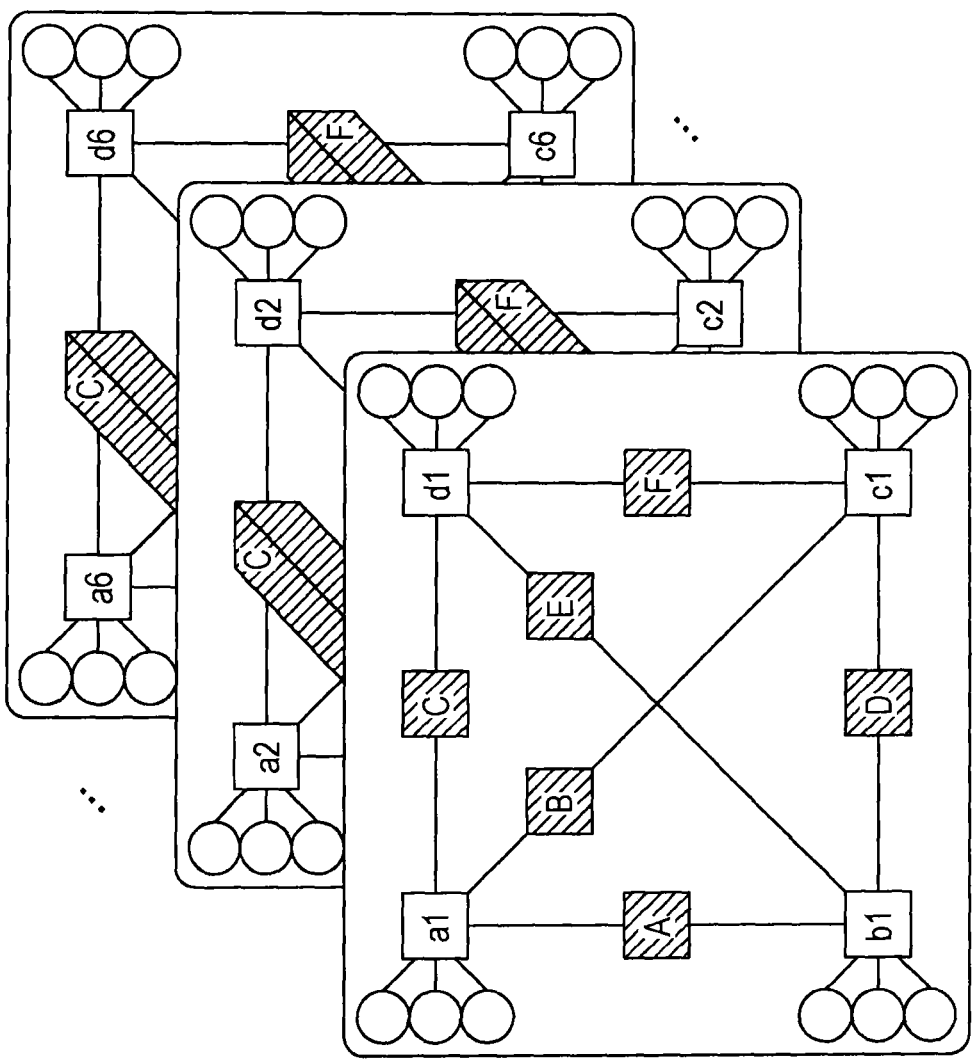
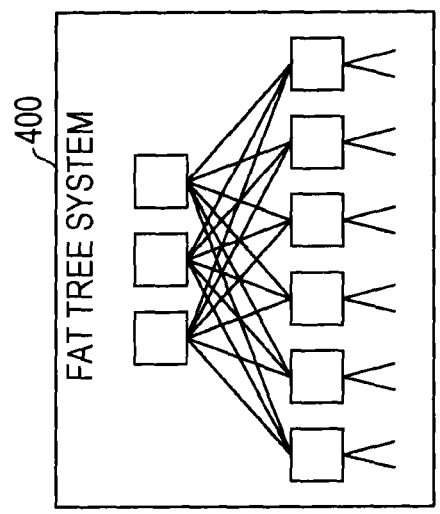
FIG. 40

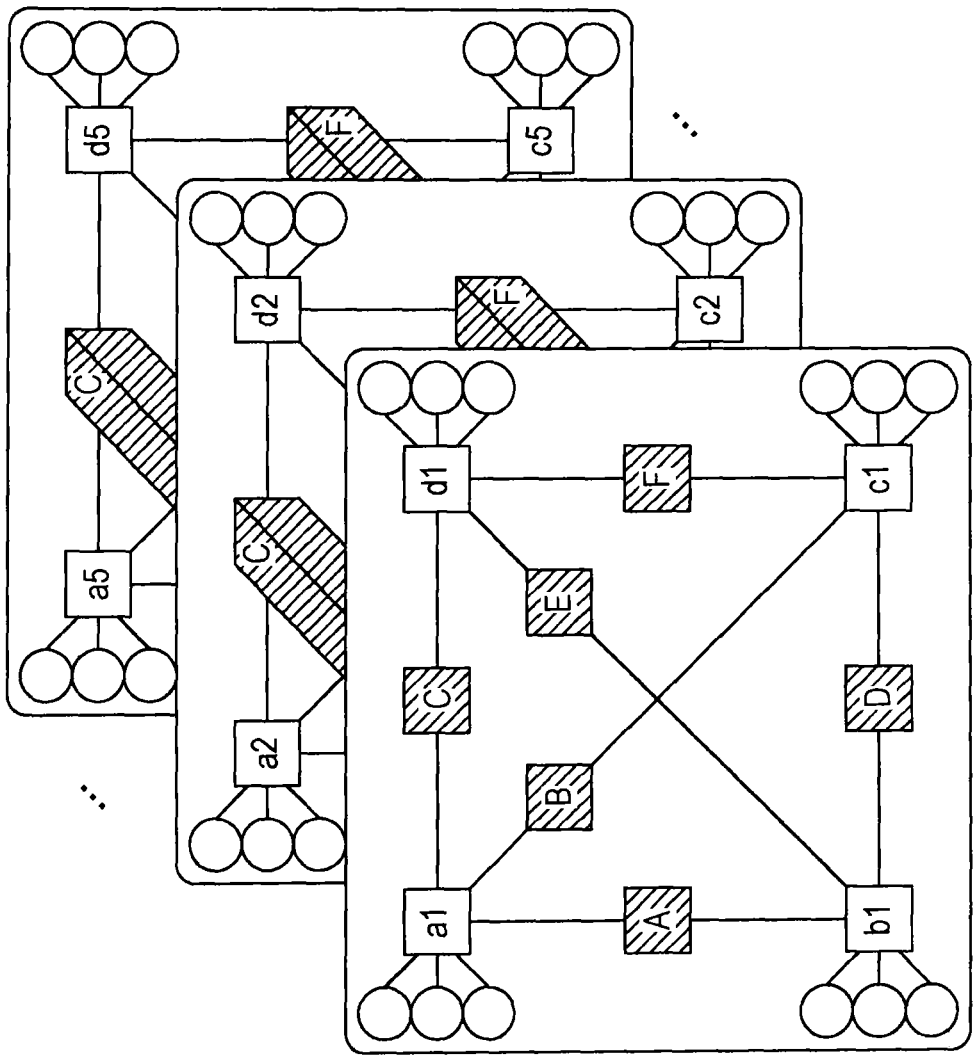
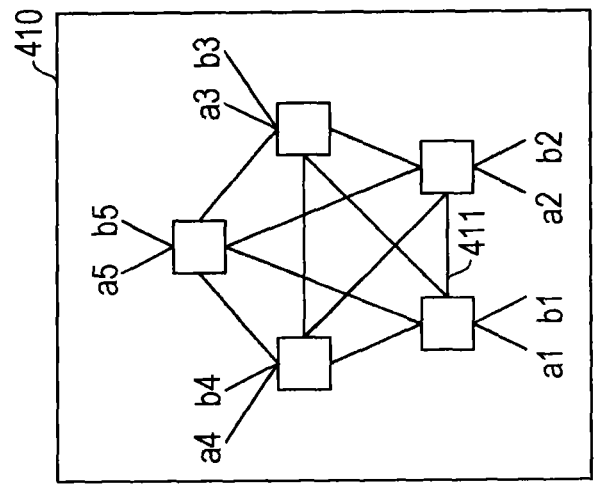
FIG. 41

APPARATUS AND METHOD FOR COLLECTIVE COMMUNICATION IN A PARALLEL COMPUTER SYSTEM

CROSS-REFERENCE TO RELATED APPLICATION

This application is based upon and claims the benefit of priority of the prior Japanese Patent Application No. 2014-100569, filed on May 14, 2014, and the Japanese Patent Application No. 2015-085618, filed on Apr. 20, 2015, the entire contents of which are incorporated herein by reference.

FIELD

The embodiments discussed herein are related to apparatus and method for collective communication in a parallel computer system.

BACKGROUND

Collective communication is performed in a parallel computer system in which a plurality of nodes execute calculations in parallel. Collective communication is communication in which each of the nodes connected to a network transmits and receives communication data to and from other plural nodes connected to the network.

The performance of a parallel computer system is likely to be affected by the speed of collective communication. A document discloses a technique of enhancing the speed of all-to-all communication (which is one type of collective communication) performed in a parallel computer, by avoiding communication path contention. Specifically, each of n computers connected via a network transmits data to a communication destination different from communication destinations of other computers in each of communication steps. Also, in each communication step, each of the n computers transmits data to a communication destination different from the communication destinations in previous communication steps, and completes transmission of all data in the computer after n communication steps.

However, an effective communication algorithm for avoiding communication path contention varies depending on a network topology. The technique in the above-mentioned document may not be applicable to a network topology other than the network topology presented in the document.

Related techniques are disclosed in, for example, Japanese Laid-open Patent Publication No. 11-110362.

SUMMARY

According to an aspect of the invention, a parallel computer system includes a plurality of network switches that are all connected to each other, and a plurality of nodes each connected to one of the plurality of network switches, where each network switch is connected to two or more nodes of the plurality of nodes. Each node determines a first destination node of data to be transmitted by the each node at a given time so that a first network switch connected to the first destination node is different from a second network switch connected to a second destination node of data transmitted by any node, other than the each node, which is connected to a network switch to which the each node is connected, and transmits data to the determined first destination node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a shift communication pattern, according to an embodiment;

FIG. 16 is a diagram illustrating an example of a transmission source group table, according to an embodiment;

FIG. 17 is a diagram illustrating an example of a destination group table, according to an embodiment;

FIG. 19 is a diagram illustrating an example of destinations, according to a second embodiment;

FIG. 20 is a diagram illustrating an example of destinations, according to a second embodiment;

FIG. 32 is a diagram illustrating an example of a table for comparing values related to an extended type full mesh topology with values related to other network topologies, according to an embodiment;

FIG. 37 is a diagram illustrating an example of destinations in each phase, according to an embodiment;

FIG. 38 is a diagram illustrating an example of destinations in each phase, according to an embodiment;

FIG. 39 is a diagram illustrating an example of destinations in each phase, according to an embodiment;

FIG. 40 is a diagram illustrating an example of a system in which 6 full mesh systems are connected, according to an embodiment;

FIG. 41 is a diagram illustrating a system in which 5 full mesh systems are connected;

DESCRIPTION OF EMBODIMENTS

First Embodiment

Figure 1:
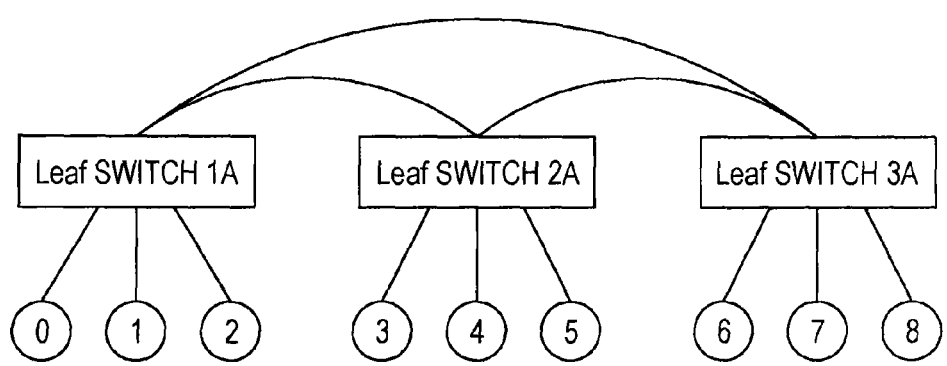
FIG. 1 is a schematic diagram of a full mesh system, according to a first embodiment.

FIG. 1 is a schematic diagram illustrating an example of a system, according to a first embodiment. In FIG. 1, Leaf switch 1A and Leaf switch 2A are directly connected, Leaf switch 1A and Leaf switch 3A are directly connected, and Leaf switch 2A and Leaf switch 3A are directly connected. Leaf switches 1A to 3A are each a network switch (for example, a local area network (LAN) switch) connected to nodes. Each of circular shapes indicates a node, and nodes 0 to 8 are each a computer that performs communication using a communication library such as a message passing interface (MPI). The nodes 0 to 2 are connected to Leaf switch 1A, the nodes 3 to 5 are connected to Leaf switch 2A, and the nodes 6 to 8 are connected to Leaf switch 3A. As illustrated, in the first embodiment, the network topology of Leaf switches 1A to 3A is a full mesh type topology (hereinafter referred to as a full mesh topology). Hereinafter, a system including Leaf switches in a full mesh network topology is referred to as a full mesh system.

In the first embodiment, the nodes 0 to 8 perform all-to-all communication. In particular, the nodes 0 to 8 perform communication in a communication pattern called a shift communication pattern. The shift communication pattern is a communication pattern in which packet switching between n nodes is performed in n phases. FIG. 2 illustrates an example shift communication pattern. In FIG. 2, for each of transmission source nodes, the node number of the destination node in each phase is illustrated. The destination of the node with a node number of k in ith phase is the node with a node number of (k+i) % n where % is the modulus operator. All-to-all communication is communication in which each of the nodes connected to a network transmits and receives a packet to and from all nodes (including the node itself) connected to the network.

Figure 3:
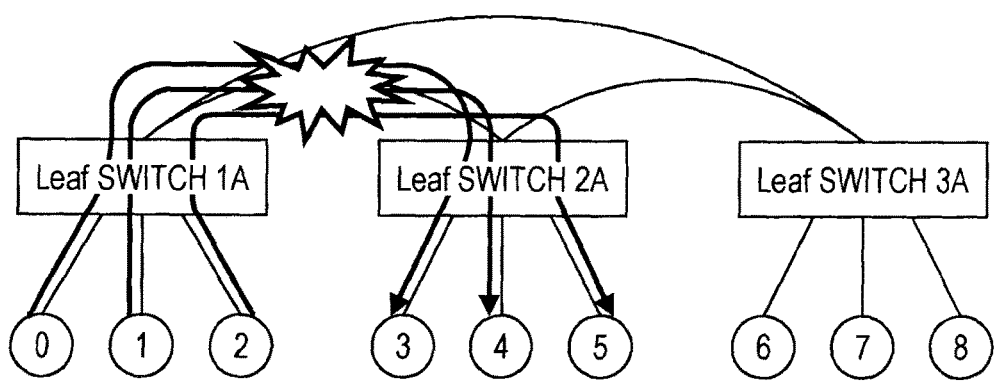
FIG. 3 is a diagram illustrating an example of communication path contention, according to an embodiment.

However, when communication is performed in the communication pattern illustrated in FIG. 2, communication path contention occurs. For example, in the phase 3, a packet is transferred from the node 0 to the node 3, a packet is transferred from the node 1 to the node 4, and a packet is transferred from the node 2 to the node 5. Then, as illustrated in FIG. 3, communication path contention occurs between Leaf switch 1A and Leaf switch 2A. When communication path contention occurs, communication is delayed and the performance of a parallel computer system decreases. So, a communication pattern, which enables communication path contention to be avoided, will be described in the following.

Figure 4:
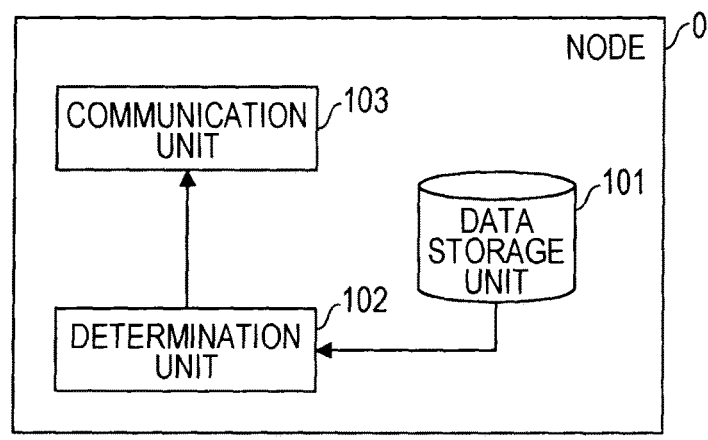
FIG. 4 is a diagram illustrating an example of a configuration of a node, according to an embodiment.

FIG. 4 is a diagram illustrating an example of a configuration of a node, according to an embodiment. In the example of FIG. 4, the node 0 includes a data storage unit 101, a determination unit 102, and a communication unit 103. The functional block diagram of each of the nodes 1 to 8 is the same as the functional block diagram of the node 0, and the description thereof is omitted.

The determination unit 102 determines a destination node of a packet in each phase based on the data stored in the data storage unit 101. The determination unit 102 outputs the node number of the determined destination node to the communication unit 103. The communication unit 103 transmits a packet including the node number of the destination node, which is received from the determination unit 102.

Figure 5:
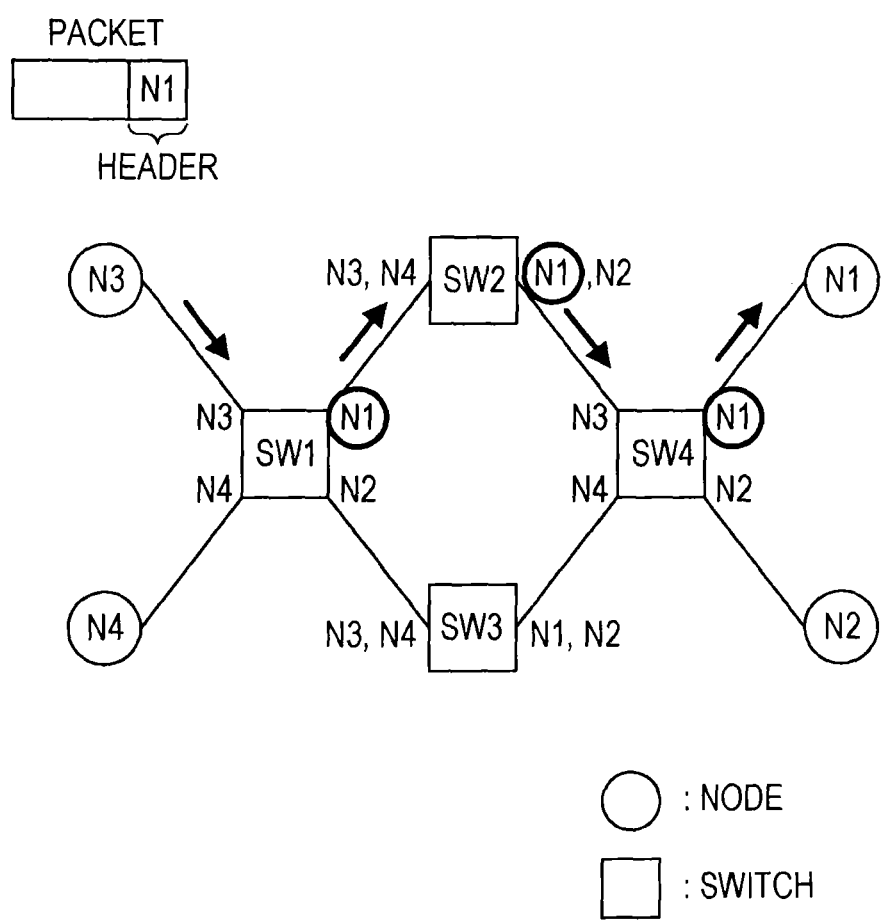
FIG. 5 is a diagram illustrating an example of routing in an InfiniBand network, according to an embodiment.

In a system that performs collective communication such as all-to-all communication, in order to avoid communication path contention, an InfiniBand network, which performs systematic and static routing, is utilized. The routing in an InfiniBand network will be described with reference to FIG. 5. In FIG. 5, each of circular shapes indicates a node and each of square shapes indicates a network switch. A line segment indicates an InfiniBand network, and a numerical value beside each line segment indicates the identification information of a destination node. A thick solid arrow indicates a communication path.

In FIG. 5, node N3 transmits a packet destined to node N1. The header of the packet includes identification information (for example, local identifier (LID)) of the destination. Each of the output ports in each network switch is associated with the identification information of a destination node, and thus the network switch outputs the packet to an output port that corresponds to the identification information of the destination included in the packet. In the example of FIG. 5, a packet reaches node N1 via network switch SW1, network switch SW2, and network switch SW4.

That is, unlike a network such as Ethernet (registered trademark) which automatically determines a route, the network according to the embodiment adopts systematic and static routing, and a consecutive node number is assigned to each of a plurality of nodes, according to a predetermined connection relationship between the plurality of nodes and a plurality of network switches.

Next, the processing performed by the nodes 0 to 8 will be described with reference to FIGS. 6 to 8. Here, the processing performed by the node 0 is taken as an example and described.

Figure 6:
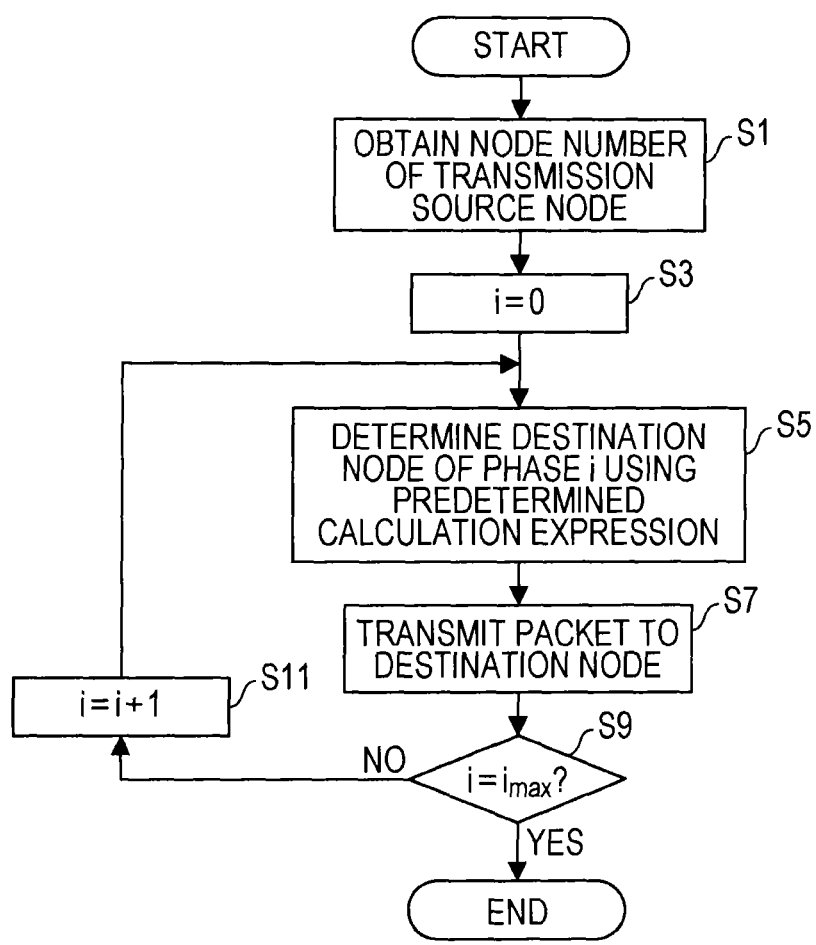
FIG. 6 is a diagram illustrating an example of an operational flowchart for main processing, according to a first embodiment.

First, the determination unit 102 in the node 0 obtains the node number of a transmission source node (here, the node 0) from the data storage unit 101 (step S1 in FIG. 6).

The determination unit 102 sets variable i at 0, the variable i indicating a phase (step S3). The determination unit 102 then calculates a node number using a predetermined calculation expression. The determination unit 102 then determines a destination node in phase i to be the node with the calculated node number (step S5).

The predetermined calculation expression is, for example, ((s % d)*d+(i+o) % d+d*(i/d)) % n, where d is the number of nodes connected to each Leaf switch, which is 3 in the embodiment, o is an offset value which is determined based on the predetermined connection relationship and will be described later with reference to FIG. 7, and s is the node number of a transmission source node. Because/is the operator to calculate an integral quotient, the decimal part of i/d is truncated.

Figure 7:
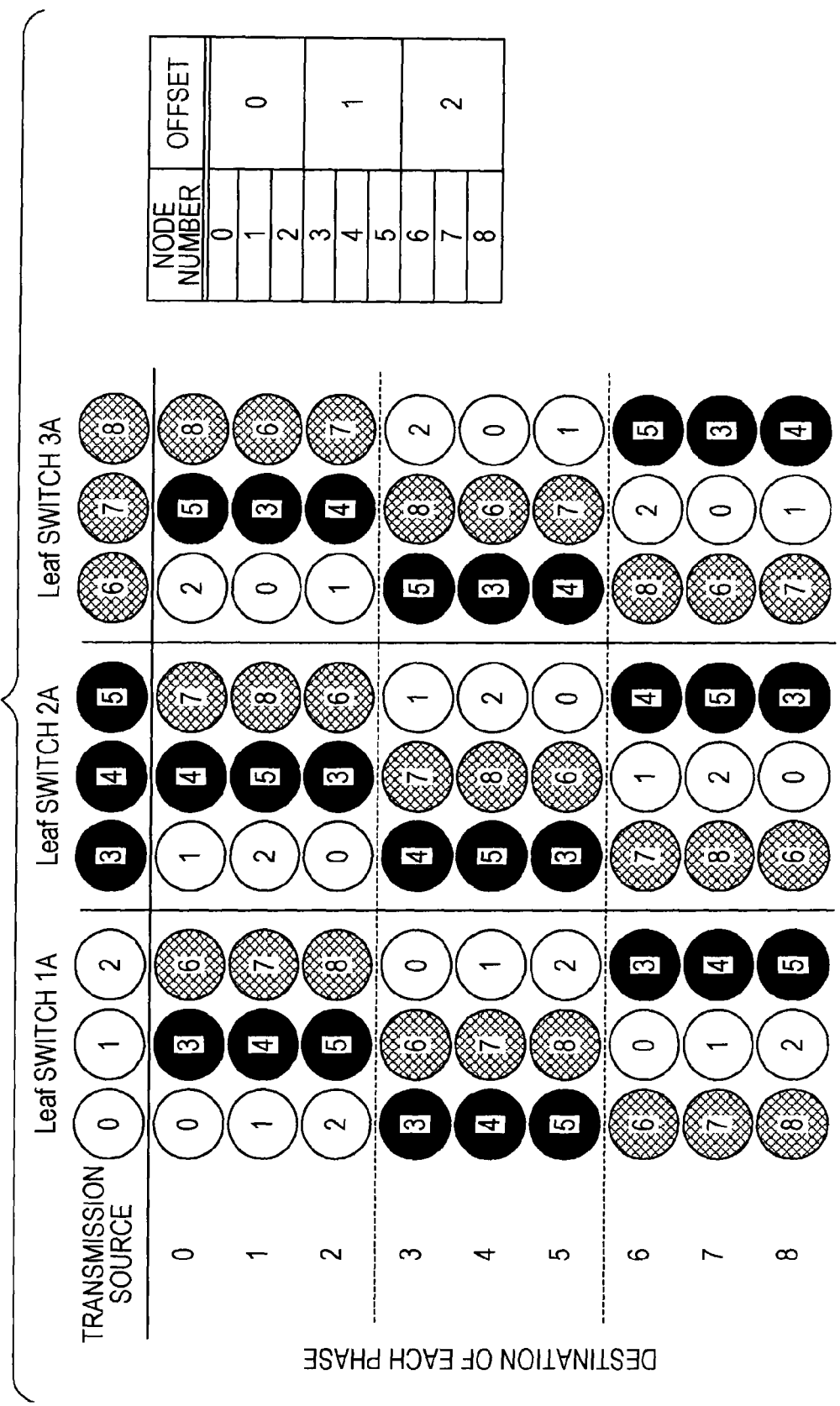
FIG. 7 is a diagram illustrating an example of destinations in each phase, according to an embodiment.
Figure 8:
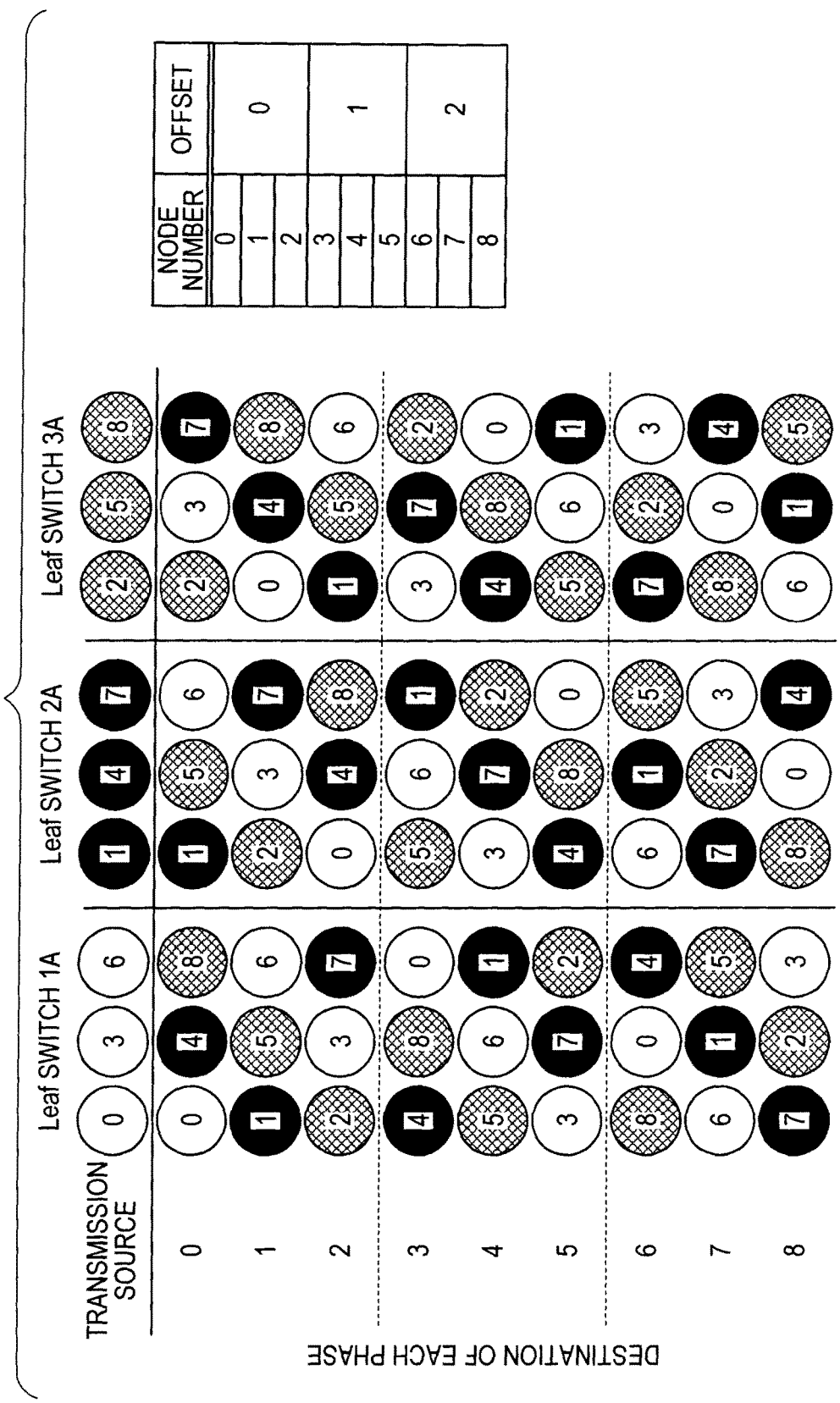
FIG. 8 is a diagram illustrating an example of destinations in each phase, according to an embodiment.

FIG. 7 illustrates an example of destinations each of which is determined by ((s % d)*d+(i+o) % d+d*(i/d)) % n. The left side of FIG. 7 illustrates the node number of a destination node of each of transmission source nodes in each phase. The nodes connected to Leaf switch 1A are indicated in white, the nodes connected to Leaf switch 2A are indicated in black, and the nodes connected to Leaf switch 3A are shaded. Assigned offset values are illustrated on the right side of FIG. 7. The offset value for the nodes 0 to 2 is 0, the offset value for the nodes 3 to 5 is 1, and the offset value for the nodes 6 to 8 is 2.

Let the node numbers of the nodes connected to Leaf switch 1A be 0, 3, 6, let the node numbers of the nodes connected to Leaf switch 2A be 1, 4, 7, and let the node numbers of the nodes connected to Leaf switch 3A be 2, 5, 8, then a predetermined calculation expression may be (d*o+(s+(o+i/d+i) % d) % d+d*(i/d)) % n. FIG. 8 illustrates destinations in this case. The left side of FIG. 8 illustrates the node number of a destination node of each of transmission source nodes in each phase. The nodes connected to Leaf switch 1A are indicated in white, the nodes connected to Leaf switch 2A are indicated in black, and the nodes connected to Leaf switch 3A are shaded. It is to be noted that the offset values for use of the above calculation expression are illustrated on the right side of FIG. 8. That is, the offset value for the nodes 0 to 2 is 0, the offset value for the nodes 3 to 5 is 1, and the offset value for the nodes 6 to 8 is 2.

Returning to the description for FIG. 6, the determination unit 102 outputs the node number of the determined destination node to the communication unit 103. The communication unit 103 then generates a packet including the node number received from the determination unit 102, and transmits the packet to a Leaf switch (here, Leaf switch 1A) connected to the node 0 (step S7).

Accordingly, Leaf switch 1A receives the packet. As described with reference to FIG. 5, Leaf switch 1A recognizes a link for transferring the packet to a destination node, and so Leaf switch 1A outputs the packet to the link.

In the embodiment, the nodes 0 to 8 executes barrier synchronization, and thus the nodes 0 to 8 perform step S7 at the same timing.

The determination unit 102 determines whether or not $i=i_{max}$ (step S9). The $i_{max}$ is a maximum node number which is 8 in the first embodiment.

When $i \ne i_{max}$ (No route in step S9), the determination unit 102 increments i by 1 (step S11), and the flow returns to the processing in step S5. On the other hand, when $i=i_{max}$ (Yes route in step S9), the processing is exited.

The processing performed by the nodes 1 to 8 is the same as the processing performed by the node 0, and thus description is omitted.

When the above-described processing is performed, packets sent out from a Leaf switch are not concentrated on a particular communication path. For instance, in the example of FIG. 7, in the phase 3, Leaf switch 2A sends out a packet whose destination is the node 4, a packet whose destination is the node 7, and a packet whose destination is the node 1. Here, the node 4 is connected to Leaf switch 2A, the node 7 is connected to Leaf switch 3A, and the node 1 is connected to Leaf switch 1A. Consequently, no communication path contention occurs.

Second Embodiment

In a second embodiment, an extended type full mesh topology will be described which is an enhanced version of the full mesh topology in the first embodiment.

Figure 9:
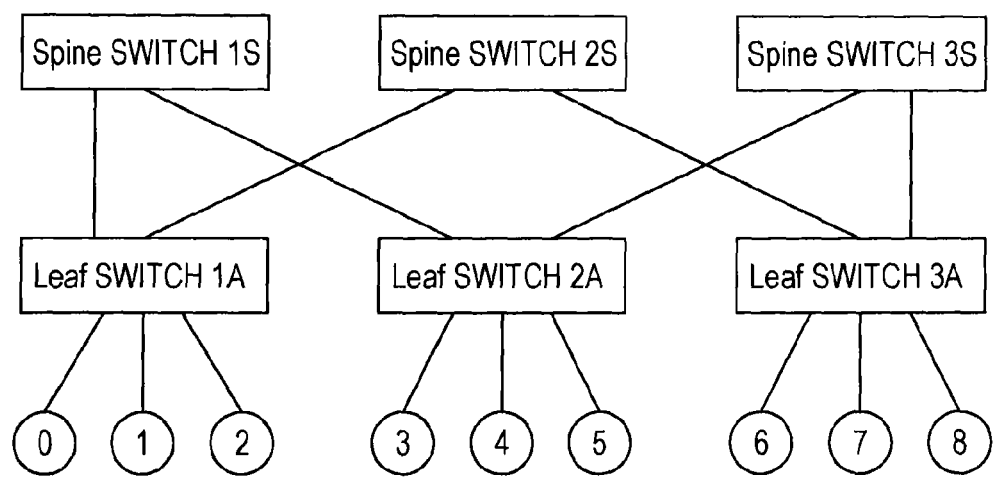
FIG. 9 is a diagram illustrating an example of a system that includes Spine switches in addition to a full mesh system, according to a first embodiment.

FIG. 9 illustrates a system that includes 3 Spine switches in addition to the full mesh system in the first embodiment. Each Spine switch is a network switch that connects a Leaf switch and a Leaf switch. In FIG. 9, Spine switch 1S connects Leaf switch 1A and Leaf switch 2A, Spine switch 2S connects Leaf switch 1A and Leaf switch 3A, and Spine switch 3S connects Leaf switch 2A and Leaf switch 3A.

The system of FIG. 9 includes Spine switches, each of which is provided on a link between Leaf switches in the full mesh system in the first embodiment. Consequently, when all-to-all communication is performed similarly to the system in the first embodiment, communication path contention may be avoided.

Figure 10:
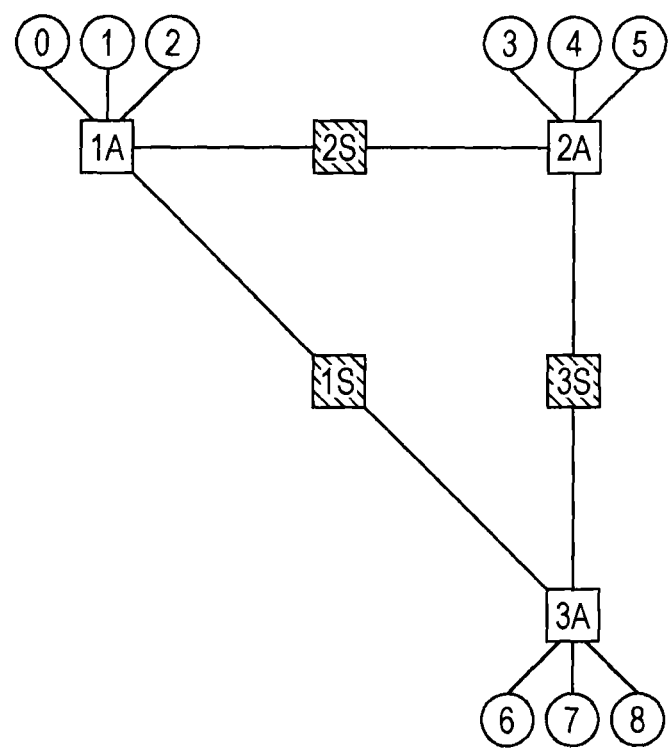
FIG. 10 is a diagram illustrating an example of a system that has the same connection configuration as the system of FIG. 9, according to an embodiment.

The connection configuration of FIG. 10 is exactly the same as the connection configuration of FIG. 9. In FIG. 10, each of unshaded square shapes indicates a Leaf switch, each of shaded square shapes indicates a Spine switch, and each of circular shapes indicates a node. Let the number of nodes connected to each Leaf switch be d (here, d=3), then the number of Leaf switches is d, the number of Spine switches is d(d−1)/2, and the number of nodes is $d*d=d^2$.

When the number of ports of each Leaf switch and each Spine switch is 6, the number of available ports of each Leaf switch is 1, and the number of available ports of each Spine switch is 4. Thus, effective use of these available ports will be discussed.

Figure 11:
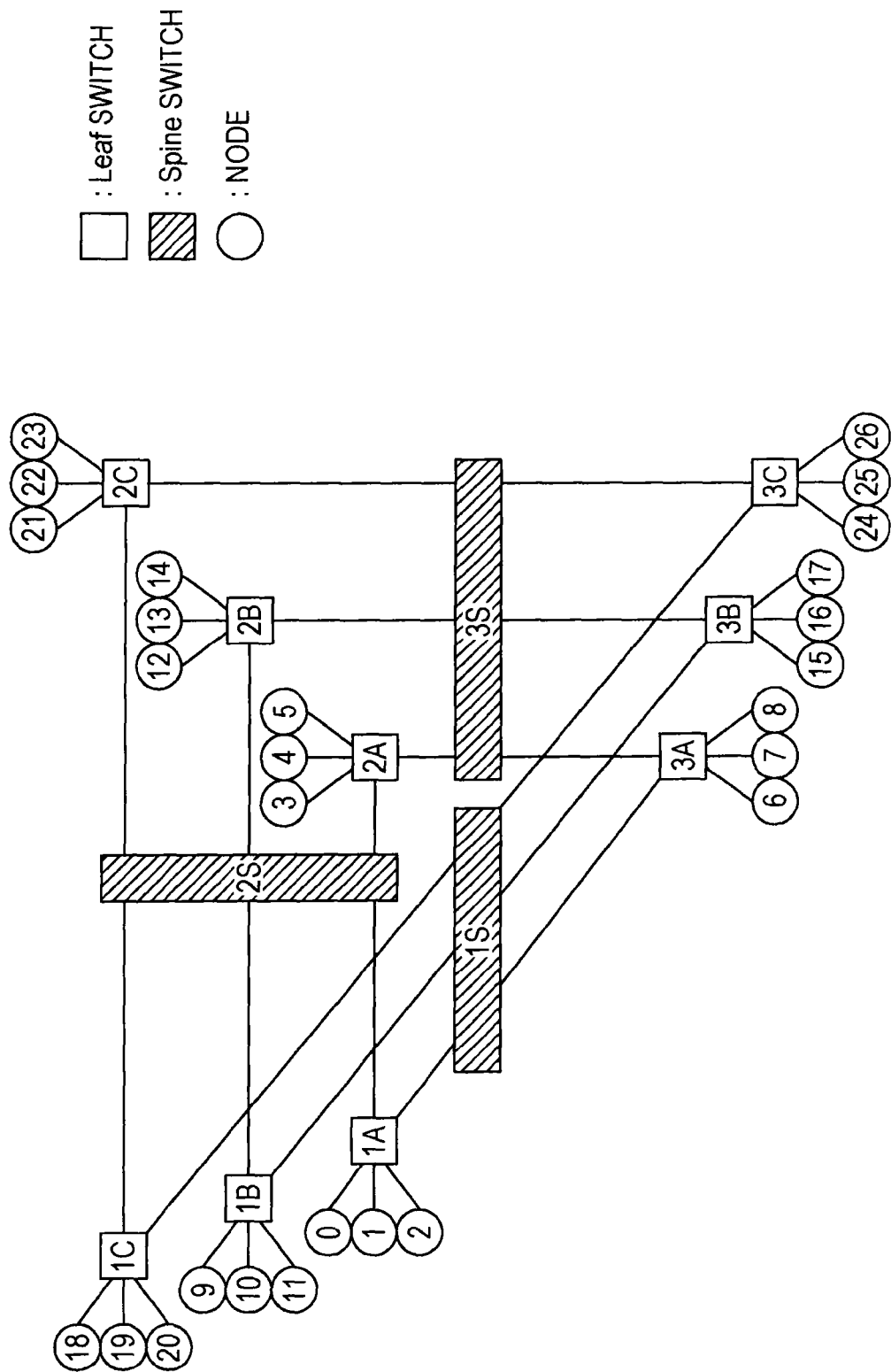
FIG. 11 is a diagram illustrating an example of a system in which a plurality of full mesh systems are connected, according to an embodiment.

FIG. 11 illustrates a system in which plural full mesh systems are connected. In FIG. 11, 4 additional Leaf switches are connected to each Spine switch, and so the total of 6 Leaf switches are connected to each Spine switch. Each Leaf switch is connected to 3 nodes. In the system of FIG. 11, each Spine switch has no longer available ports because all available ports have been used for connection to Leaf switches. In this way, the entire system is able to connect more nodes compared with the system of FIG. 10.

However, in the system of FIG. 11, each Leaf switch has one available port. Also, each Leaf switch has only 2 links connected to Spine switches. Therefore, in the case where all destinations of 3 packets sent from a Leaf switch in a phase are nodes each belonging to another Leaf switch, the 3 packets are sent via 2 links, thereby causing communication path contention.

Figure 12:
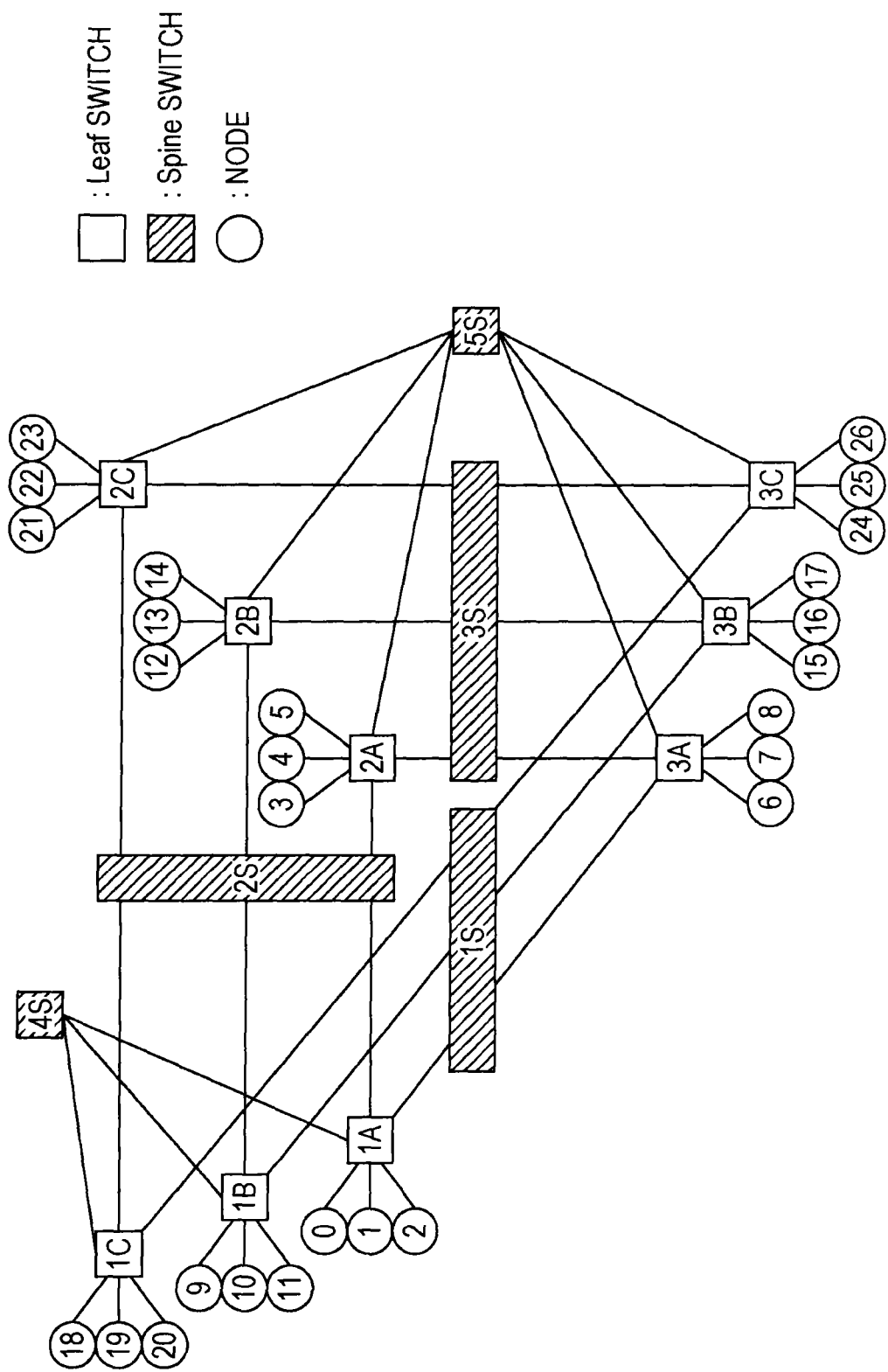
FIG. 12 is a diagram illustrating an example of a system that includes Spine switches in addition to the system of FIG. 11, according to an embodiment.

Thus, the system illustrated in FIG. 12 is implemented by adding 2 Spine switches to the system of FIG. 11. In FIG. 12, there are provided Spine switch 4S connected to Leaf switches 1A to 1C, and Spine switch 5S connected to Leaf switches 2A to 2C and Leaf switches 3A to 3C. Let the number of nodes connected to each Leaf switch be d (here, d=3), then the number of Leaf switches is $d^2$, the number of Spine switches is $d(d-1)/2+[d/2] \approx 3d^2/2$, and the number of nodes is $d^2*d=d^3$. The number of nodes per switch is $d^3/(3d^2/2)=2d/3$. It is to be noted that [d/2] is an integer to which d/2 is rounded up. For example, when d/2=1.5, [d/2]=2.

Figure 13:
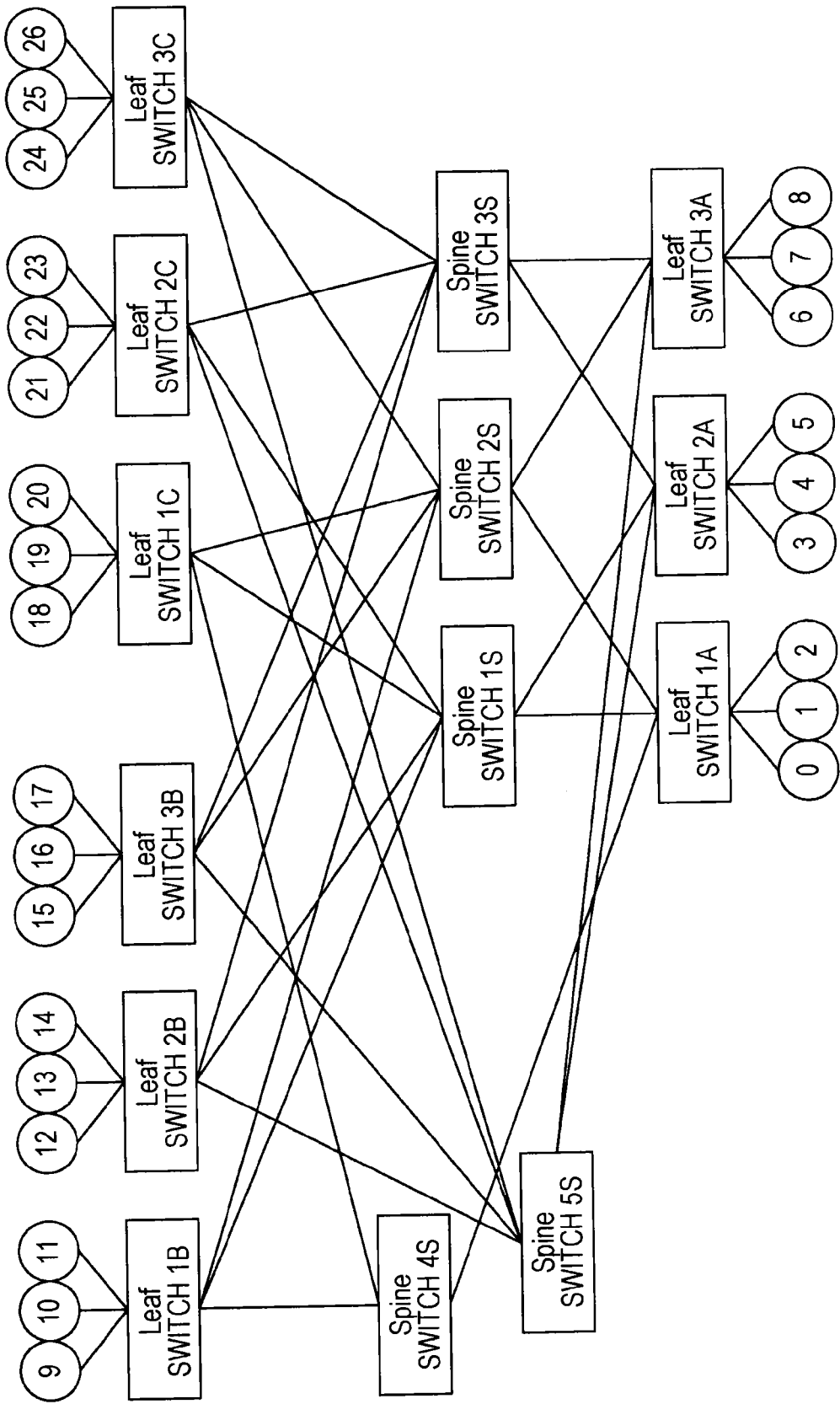
FIG. 13 is a diagram illustrating an example of a system that has the same connection configuration as the system of FIG. 12, according to an embodiment.

The connection configuration of FIG. 13 is exactly the same as the connection configuration of FIG. 12. It is to be noted that arranging Spine switches 1S to 5S of FIG. 13 in a single row gives FIG. 14.

Figure 14:
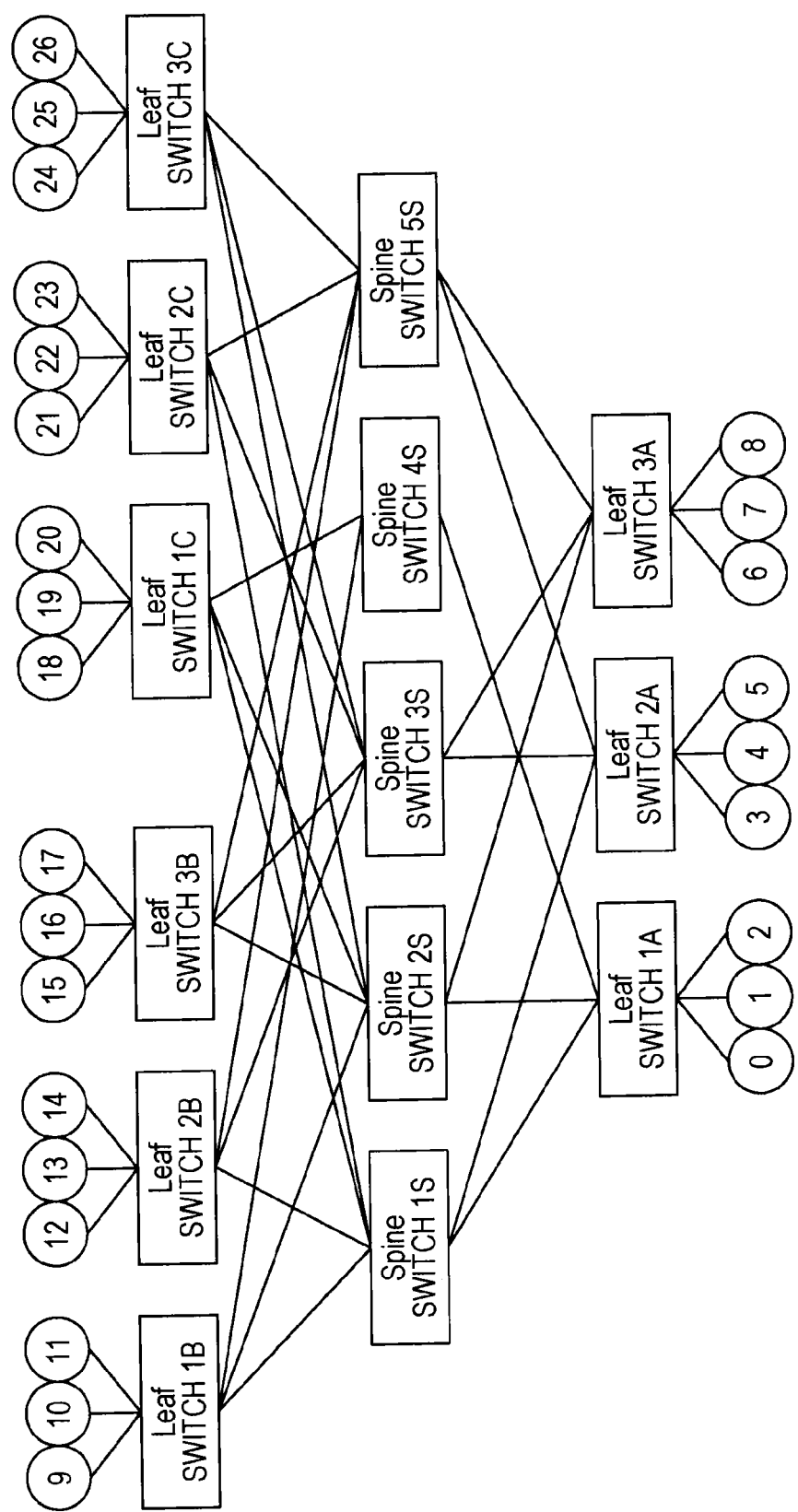
FIG. 14 is a diagram illustrating an example of a system in which the Spine switches in the system of FIG. 13 are arranged in a row, according to an embodiment.

In FIGS. 13 and 14, Spine switch 1S is connected to Leaf switch 1A, Leaf switch 1B, Leaf switch 1C, Leaf switch 2A, Leaf switch 2B, and Leaf switch 2C. Spine switch 2S is connected to Leaf switch 1A, Leaf switch 1B, Leaf switch 1C, Leaf switch 3A, Leaf switch 3B, and Leaf switch 3C. Spine switch 3S is connected to Leaf switch 2A, Leaf switch 2B, Leaf switch 2C, Leaf switch 3A, Leaf switch 3B, and Leaf switch 3C. Spine switch 4S is connected to Leaf switch 1A, Leaf switch 1B, and Leaf switch 1C. Spine switch 5S is connected to Leaf switch 2A, Leaf switch 2B, Leaf switch 2C, Leaf switch 3A, Leaf switch 3B, and Leaf switch 3C. Leaf switch 1A is connected to the nodes 0 to 2. Leaf switch 2A is connected to the nodes 3 to 5. Leaf switch 3A is connected to the nodes 6 to 8. Leaf switch 1B is connected to the nodes 9 to 11. Leaf switch 2B is connected to the nodes 12 to 14. Leaf switch 3B is connected to the nodes 15 to 17. Leaf switch 1C is connected to the nodes 18 to 20. Leaf switch 2C is connected to the nodes 21 to 23. Leaf switch 3C is connected to the nodes 24 to 26.

Figure 15:
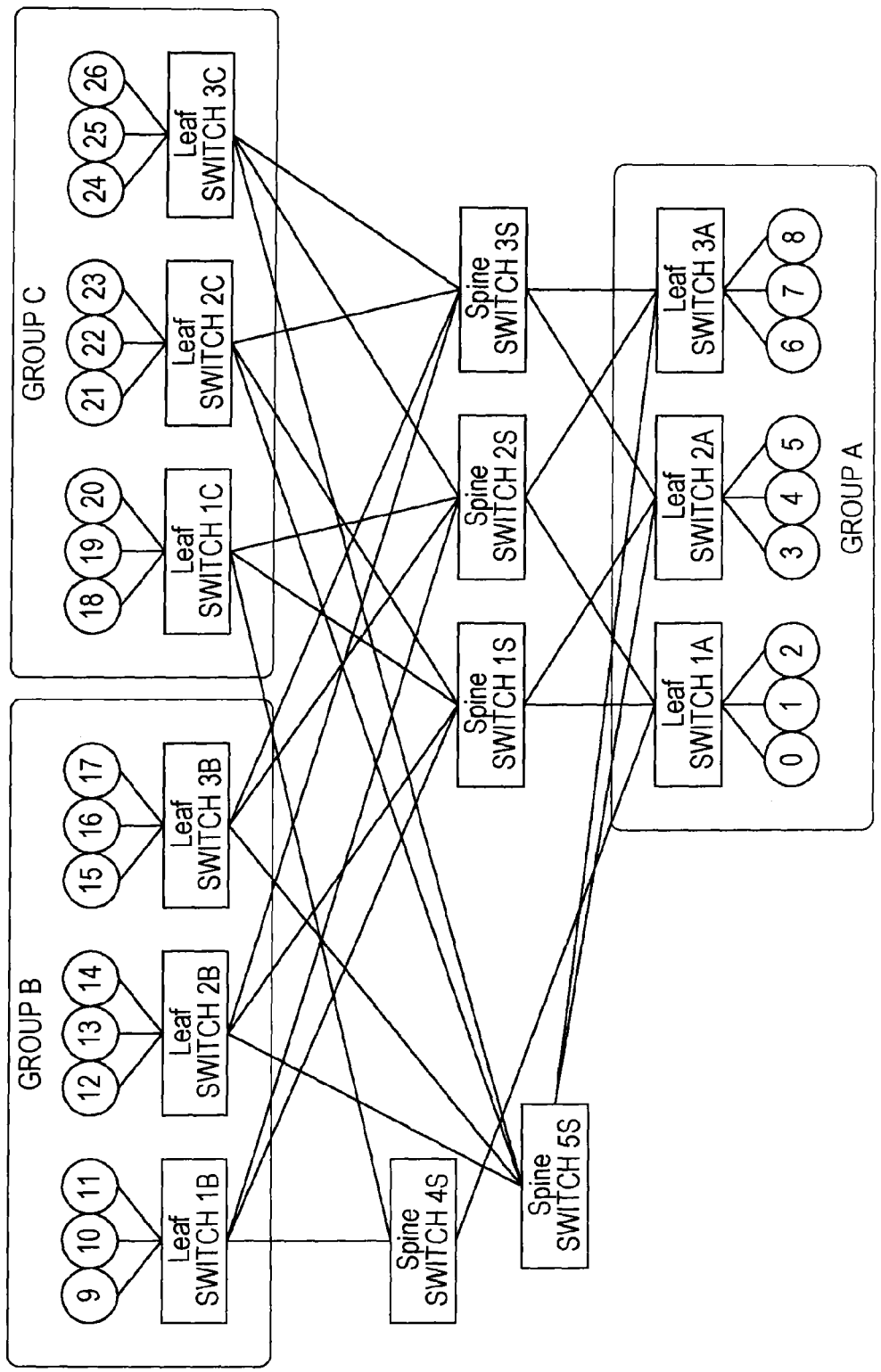
FIG. 15 is a diagram illustrating an example of grouping of Leaf switches and nodes, according to an embodiment.

Grouping the Leaf switches and nodes in the system of FIG. 13 gives FIG. 15. In FIG. 15, group A includes Leaf switch 1A, the nodes 0 to 2, Leaf switch 2A, the nodes 3 to 5, Leaf switch 3A, and the nodes 6 to 8. Group B includes Leaf switch 1B, the nodes 9 to 11, Leaf switch 2B, the nodes 12 to 14, Leaf switch 3B, and the nodes 15 to 17. Group C includes Leaf switch 1C, the nodes 18 to 20, Leaf switch 2C, the nodes 21 to 23, Leaf switch 3C, and the nodes 24 to 26.

In the second embodiment, the system illustrated in FIG. 15 is adopted. The network topology according to the second embodiment system is referred to as an extended type full mesh topology.

The functional block diagram of the nodes 0 to 26 in the second embodiment is the same as the functional block diagram illustrated in FIG. 4, and thus description is omitted.

FIG. 16 illustrates an example of a transmission source group table which is stored in the data storage unit 101. In the example of FIG. 16, the transmission source group table stores the node numbers of transmission source nodes and identification information of a group to which some transmission source nodes belong.

FIG. 17 illustrates an example of a destination group table which is stored in the data storage unit 101. In the example of FIG. 17, the destination group table stores identification information of a group to which a destination node belongs in connection with a combination of a phase and identification information of a group to which a transmission source node belongs. The number in each pair of parentheses is a group offset value.

Next, the processing performed by the nodes 0 to 26 will be described with reference to FIGS. 18 to 20. Here, the processing performed by the node 0 is taken as an example and described.

Figure 18:
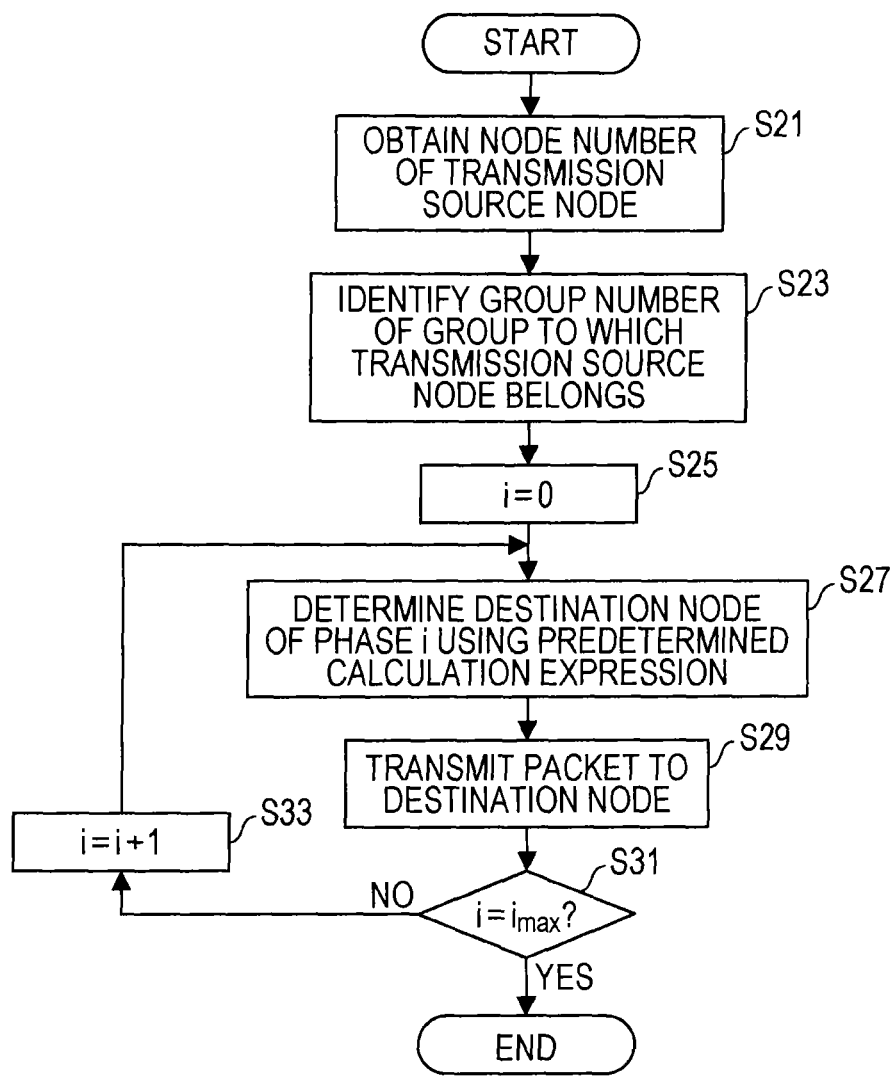
FIG. 18 is a diagram illustrating an example of an operational flowchart for main processing, according to a second embodiment.

First, the determination unit 102 in the node 0 obtains the node number of a transmission source node (here, the node 0) from the data storage unit 101 (step S21 in FIG. 18).

The determination unit 102 identifies identification information of a group from the transmission source group table, the group corresponding to the node number obtained in step S21 (step S23).

The determination unit 102 sets variable i at 0, the variable i indicating a phase (step S25). The determination unit 102 then calculates a node number using a predetermined calculation expression. The determination unit 102 then determines a destination node in phase i to be the node with the calculated node number (step S27).

The predetermined calculation expression is, for example, $((s\,\%\,d)*d+(i+o)\,\%\,d+d*(i/d))\,\%\,n+g$, where d is the number of nodes connected to each Leaf switch, which is 3 in the embodiment, s is the node number of a transmission source node, n is the number of nodes per group, which is 9 in the embodiment, o is an offset value which is determined based on the predetermined connection relationship, and g is a group offset value which is identified by the transmission source group table. The offset value for the nodes 0 to 2, the nodes 9 to 11, and the nodes 18 to 20 is 0, the offset value for the nodes 3 to 5, the nodes 12 to 14, and the nodes 21 to 23 is 1, and the offset value for the nodes 6 to 8, the nodes 15 to 17, and the nodes 24 to 26 is 2.

The determination unit 102 outputs the node number of the determined destination node to the communication unit 103. The communication unit 103 then generates a packet including the node number received from the determination unit 102, and transmits the packet to a Leaf switch (here, Leaf switch 1A) connected to the node 0 (step S29).

In response, Leaf switch 1A receives the packet. As described with reference to FIG. 5, Leaf switch 1A recognizes a link for transferring the packet to a destination node, and outputs the packet to the recognized link.

In the embodiment, since the nodes 0 to 26 execute barrier synchronization, the nodes 0 to 26 each performs step S29 at the same timing.

The determination unit 102 determines whether or not $i=i_{max}$ (step S31). The $i_{max}$ is a maximum number indicating a phase, which is 26 in the first embodiment.

When $i \ne i_{max}$ (No in step S31), the determination unit 102 increments i by 1 (step S33), and the flow returns to the processing in step S27. On the other hand, when $i=i_{max}$ (Yes in step S31), the processing is exited.

The processing performed by the nodes 1 to 26 is the same as the processing performed by the node 0, and thus descriptions thereof are omitted.

Figure 19:
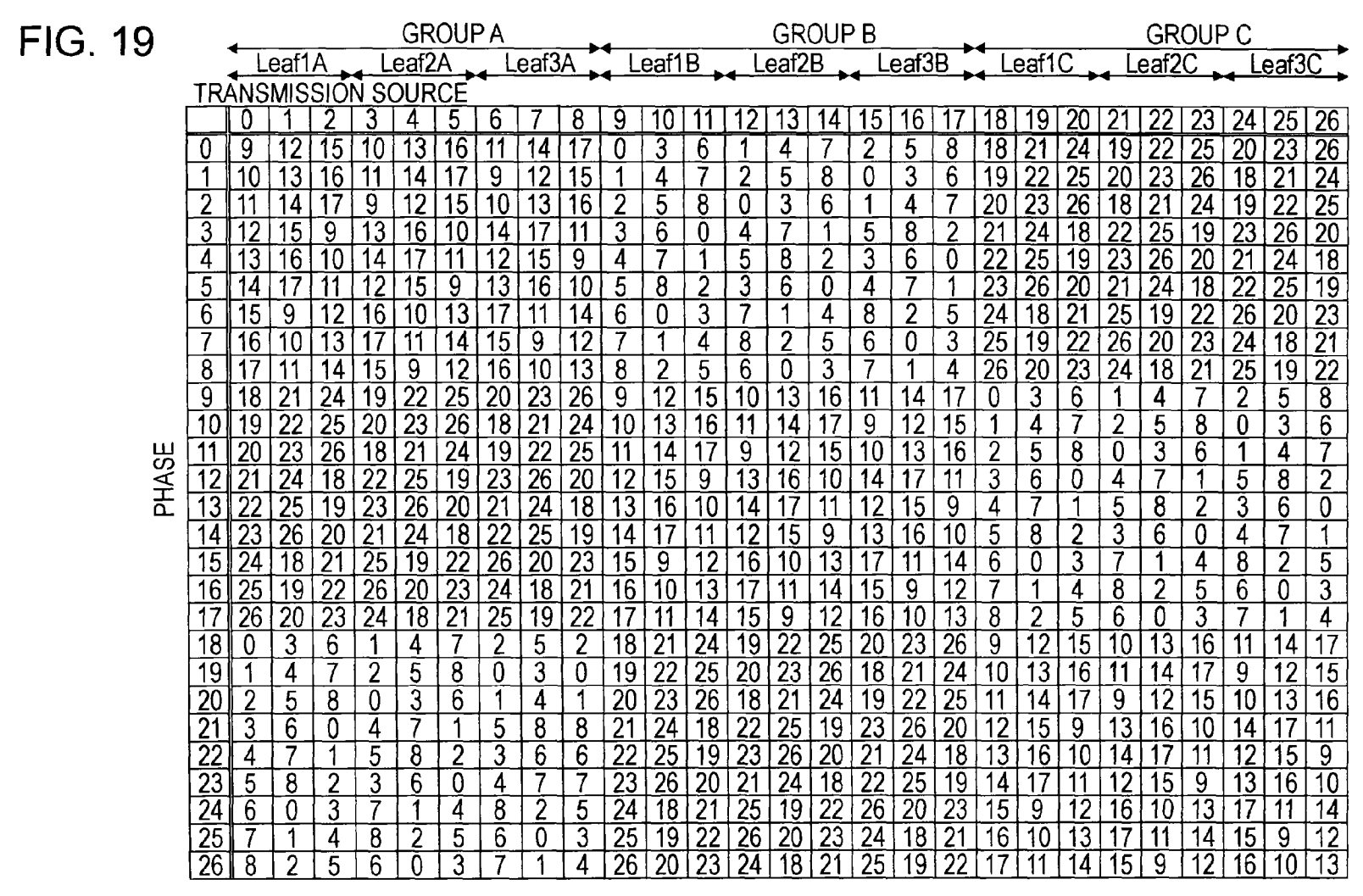

FIG. 19 illustrates an example of destinations each of which is determined by the above-described processing. FIG. 19 illustrates the node number of a destination node of each of transmission source nodes in each phase.

Figure 20:
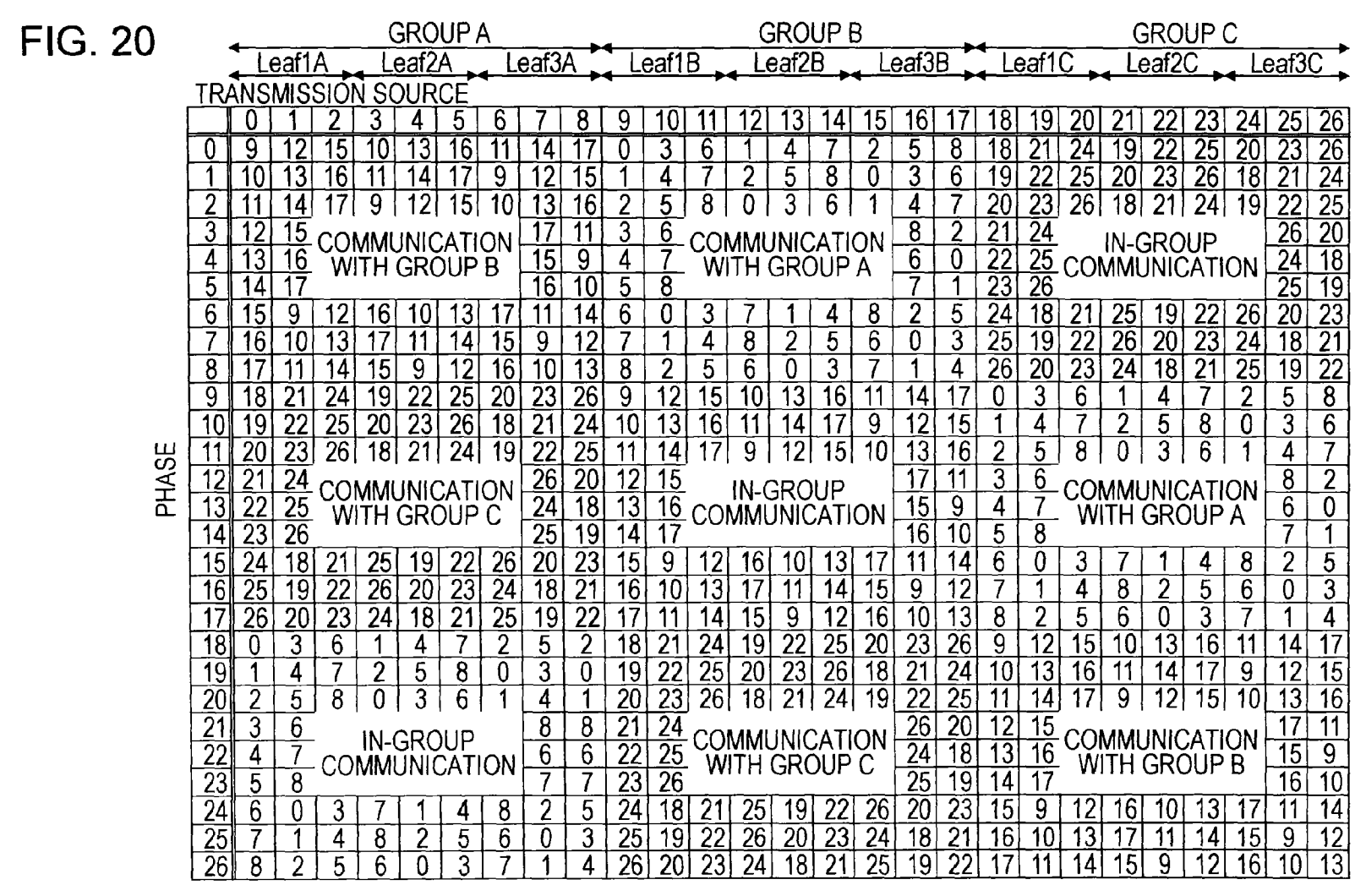

These destinations have the characteristic as illustrated in FIG. 20. First, the nodes belonging to the same group each transmit a packet to the same destination group in the same phase. For example, the nodes 0 to 8 belonging to group A each transmit a packet to a node of group B in each of the phases 0 to 8. On the other hand, nodes belonging to different groups each transmit a packet to different groups in the same phase. For example, the nodes 0 to 8 belonging to group A each transmit a packet to a node in group C in the phase 9, whereas the nodes 9 to 17 belonging to group B each transmit a packet to a node in group B in the phase 9.

Also, 3 packets sent out from a single Leaf switch in a phase are destined for different Leaf switches. For example, in the phase 17, Leaf switch 2A sends a packet to Leaf switch 1C, a packet to Leaf switch 2C, and a packet to Leaf switch 3C.

Next, the processing flow of determining Spine switches via which a packet is transferred before the packet reaches a destination node will be described with reference to FIGS. 21 to 25. Here, an example is presented in which the node 0 performs the processing. However, another node may perform the processing. Alternatively, the processing may be performed by a path data generation device (not illustrated) which is provided separately from the nodes 0 to 26.

Figure 21:
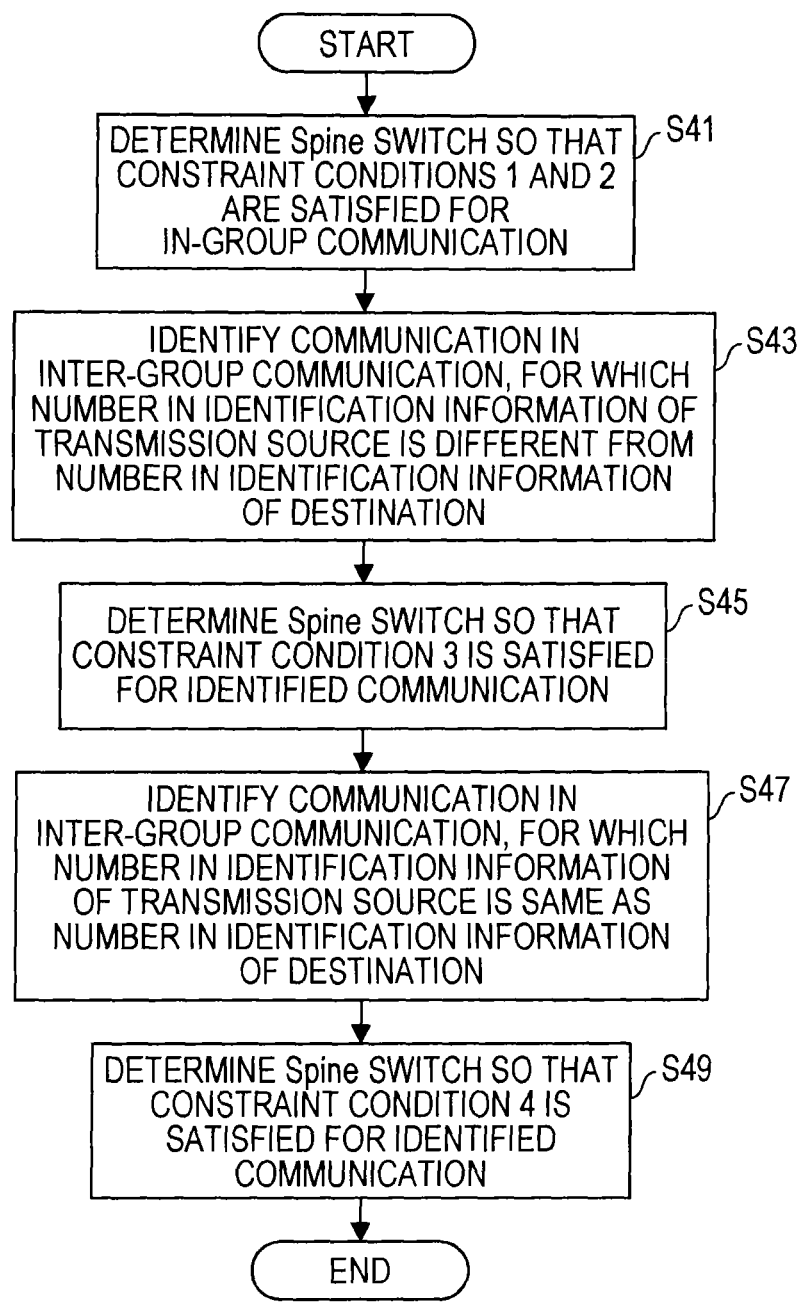
FIG. 21 is a diagram illustrating an example of an operational flowchart for determining Spine switches via which a packet is sent before the packet reaches a destination node, according to an embodiment.
Figure 22:
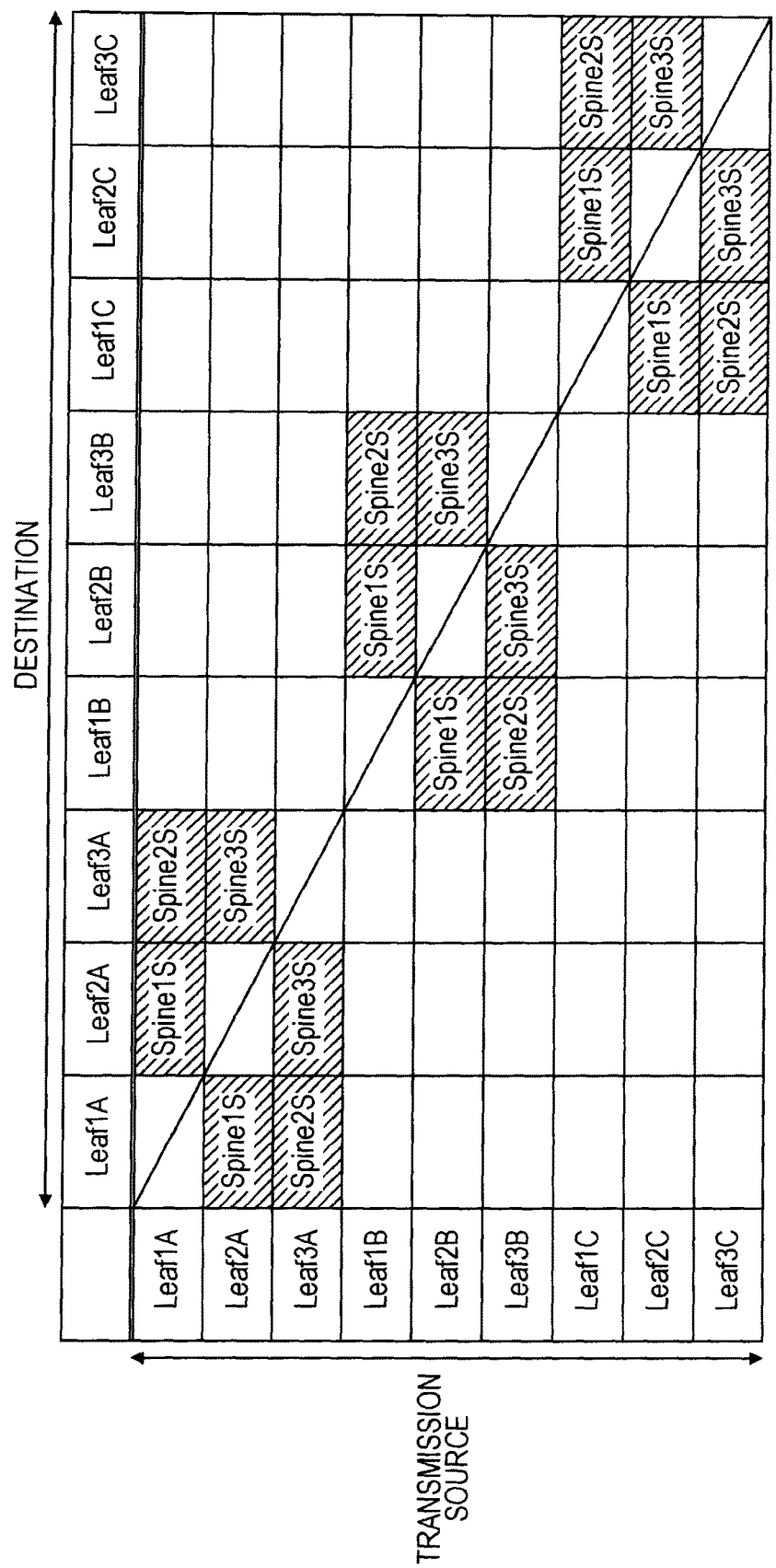
FIG. 22 is a diagram illustrating an example of writing to a Spine switch table, according to an embodiment.

First, the determination unit 102 of the node 0 determines a Spine switch out of Spine switches 1S to 3S so that constraint conditions 1 and 2 are satisfied for in-group communication (step S41 in FIG. 21). The determination unit 102 then writes identification information of the determined Spine switch to a Spine switch table which is stored in the data storage unit 101. The in-group communication is communication in which a transmission source node and a destination node belong to the same group. The constraint condition 1 is that identification information of the same Spine switch is not repeated in any row and identification information of the same Spine switch is not repeated in any column in the Spine switch table. The constraint condition 2 is that two elements symmetric with respect to a symmetry axis are the same, the symmetry axis being through elements having the same identification information of Leaf switch in the row direction and the column direction. FIG. 22 illustrates an example of a Spine switch table at the time when the processing in step S41 is performed. The portions written by the processing in step S41 are shaded.

The determination unit 102 identifies communication out of inter-group communication such that the number in identification information of a Leaf switch connected to a transmission source node is different from the number in identification information of a Leaf switch connected to a destination node (step S43). In step S43, for example, the communication between Leaf switch 1A and Leaf switch 2B is identified.

Figure 23:
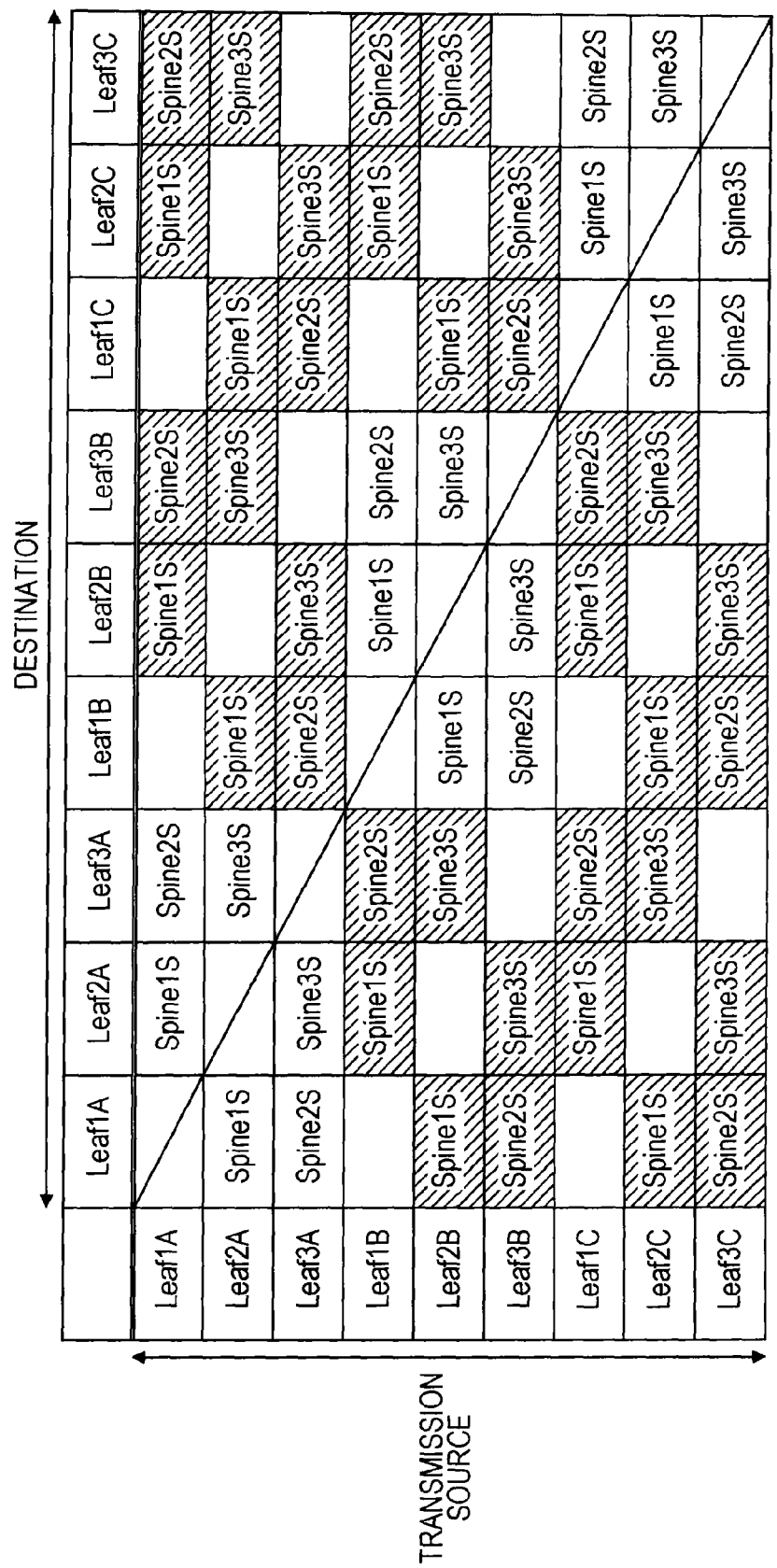
FIG. 23 is a diagram illustrating an example of writing to a Spine switch table, according to an embodiment.

The determination unit 102 determines a Spine switch out of Spine switches 1S to 3S so that constraint condition 3 is satisfied for the communication identified in step S43 (step S45). The determination unit 102 then writes identification information of the determined Spine switch to the Spine switch table which is stored in the data storage unit 101. The constraint condition 3 is that when elements in the same row have the same numbers in identification information of Leaf switches connected to destination nodes, the same Spine switch is assigned to the elements. FIG. 23 illustrates an example Spine switch table at the time when the processing in step S45 is performed. The portions written by the processing in step S45 are shaded.

The determination unit 102 identifies communication out of inter-group communication such that the number in identification information of a Leaf switch connected to a transmission source node is the same as the number in identification information of a Leaf switch connected to a destination node (step S47). In step S47, for example, the communication between Leaf switch 1A and Leaf switch 1B is identified.

Figure 24:
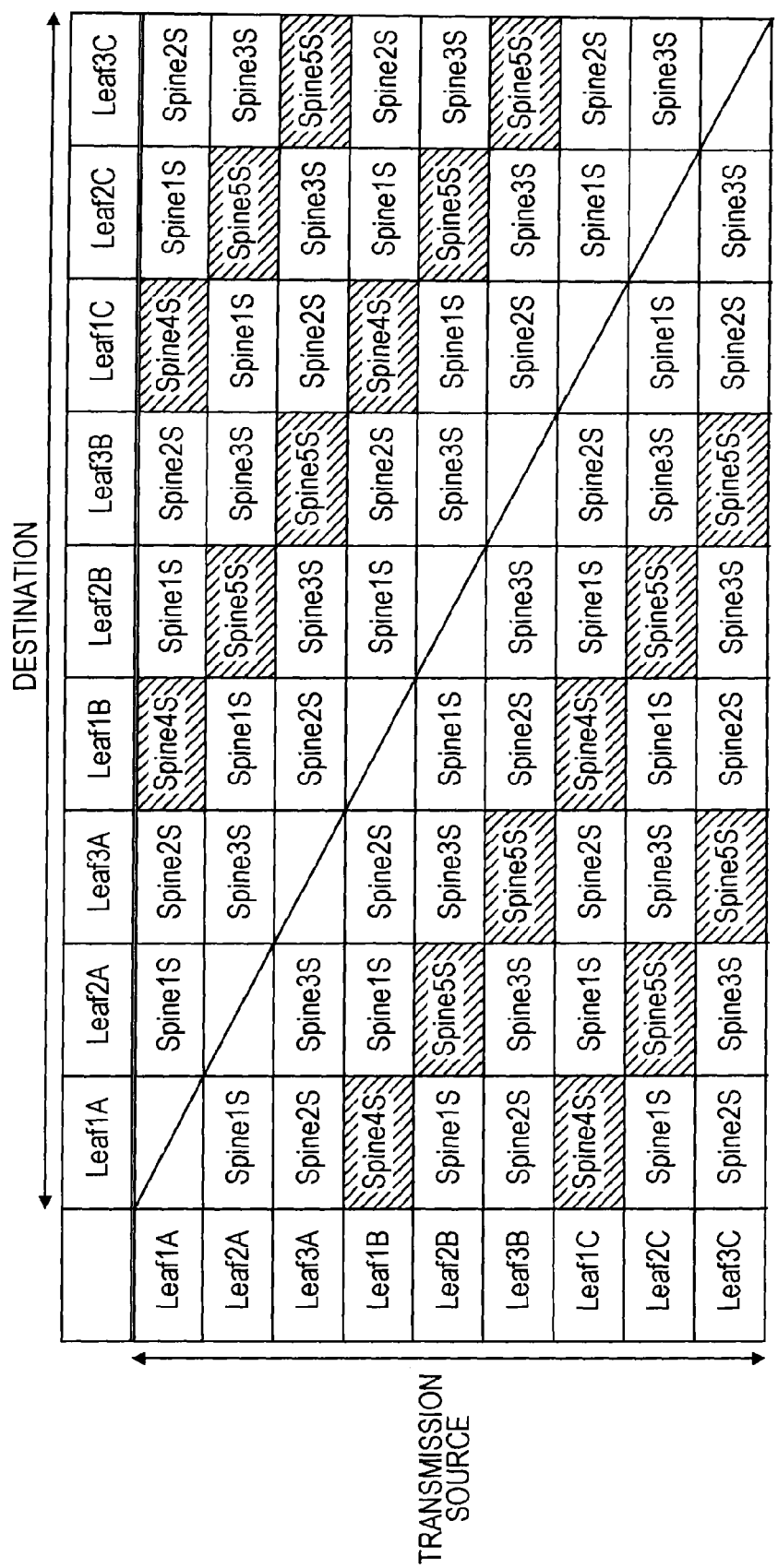
FIG. 24 is a diagram illustrating an example of writing to a Spine switch table, according to an embodiment.

The determination unit 102 determines a Spine switch out of Spine switches 4S and 5S so that constraint condition 4 is satisfied for the communication identified in step S47 (step S49). The determination unit 102 then writes identification information of the determined Spine switch to the Spine switch table which is stored in the data storage unit 101. The constraint condition 4 is that when the number in identification information of a Leaf switch connected to a transmission source node is the same as the number in identification information of a Leaf switch connected to a destination node, a Spine switch that connects the both Leaf switches is assigned. FIG. 24 illustrates an example of a Spine switch table at the time when the processing in step S49 is performed. The portions written by the processing in step S49 are shaded.

Figure 25:
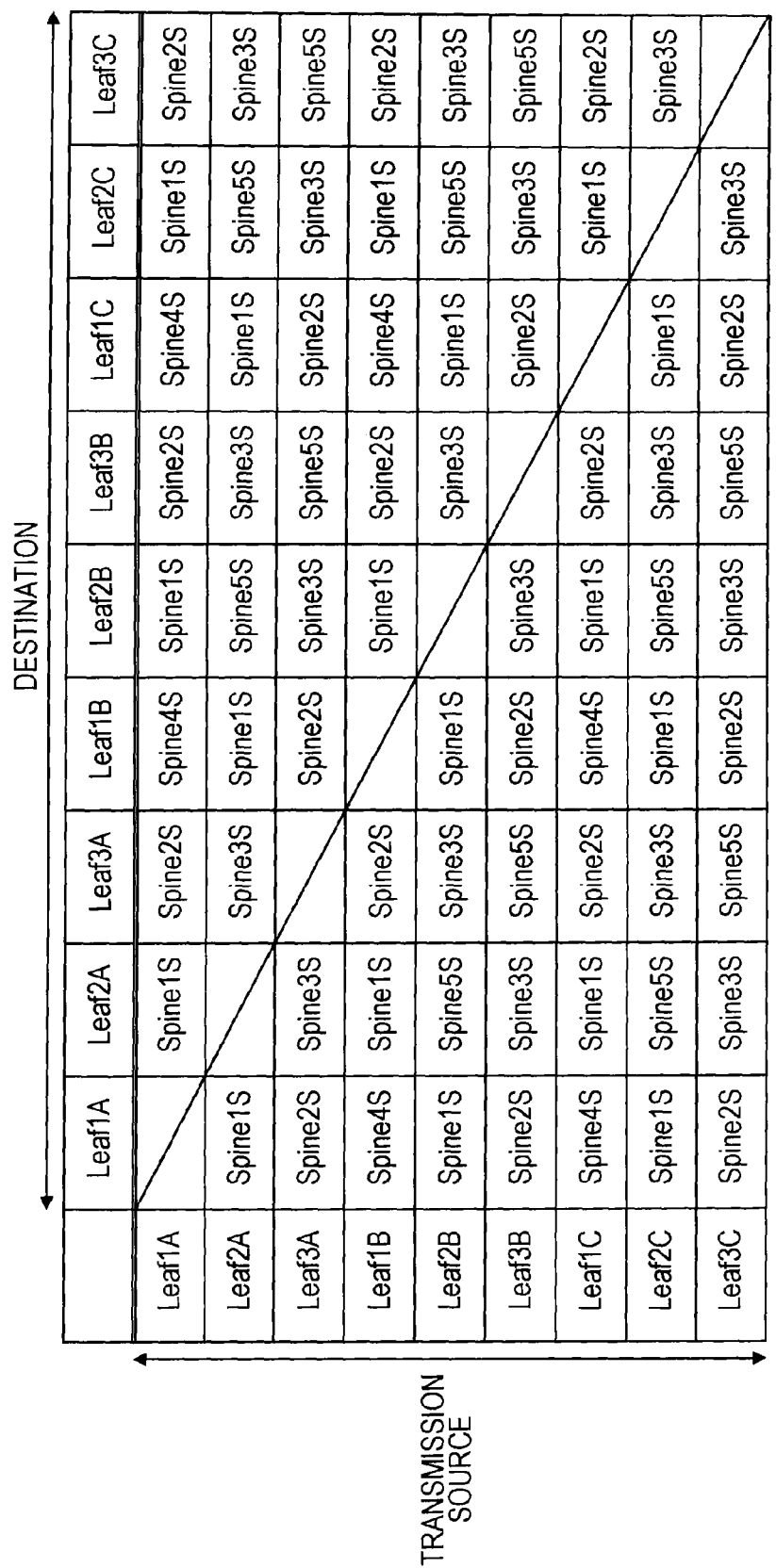
FIG. 25 is a diagram illustrating an example of a generated Spine switch table, according to an embodiment.

When the above-described processing is performed, the Spine switch table as illustrated in FIG. 25 is completed. The node 0 transmits the information of the Spine switch table to each Spine switch and each Leaf switch in the system. When each Spine switch and each Leaf switch perform routing according to the received information, communication path contention does not occur.

Figure 26:
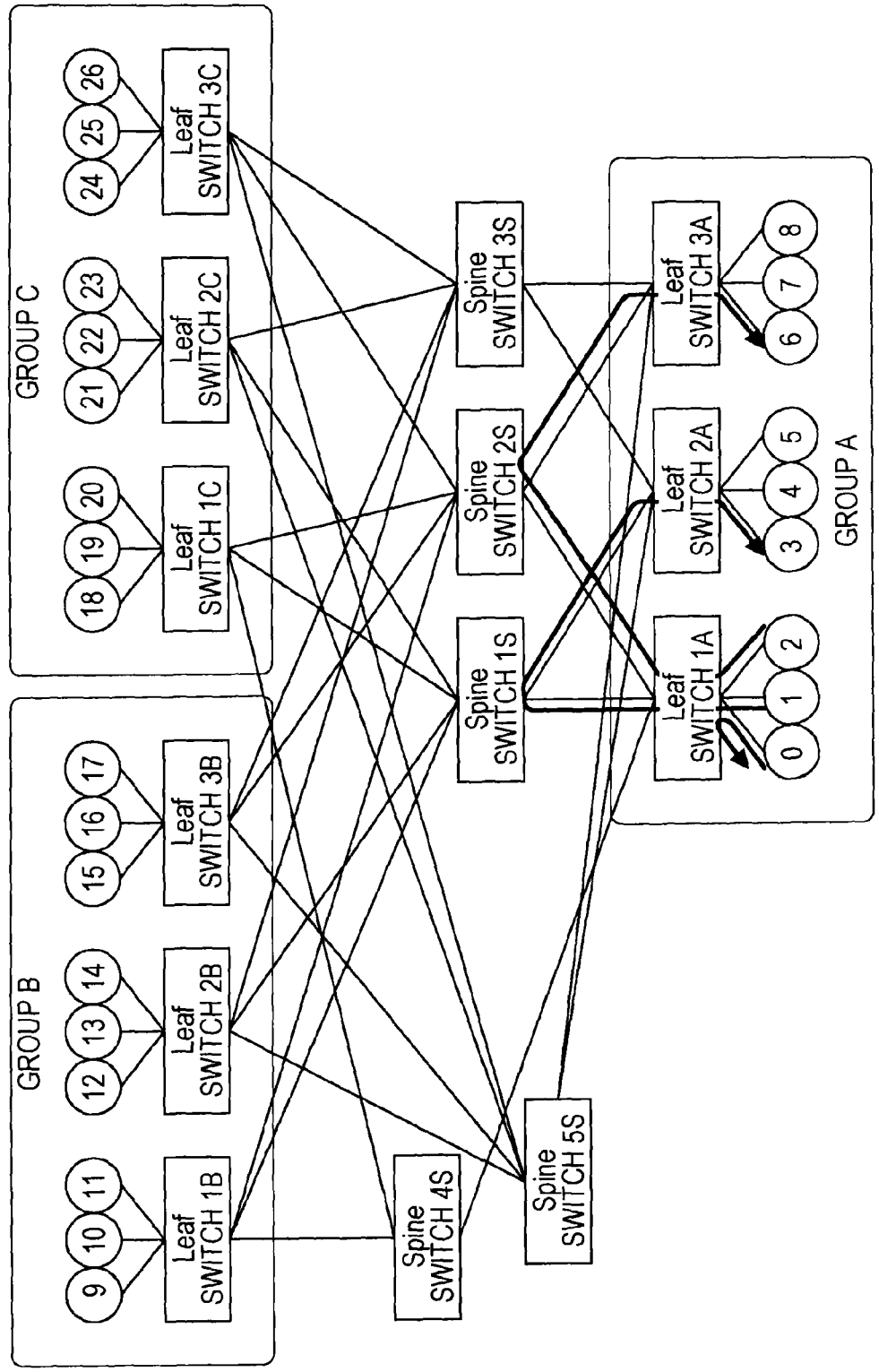
FIG. 26 is a diagram illustrating an example of communication paths for communication in a group, according to an embodiment.
Figure 27:
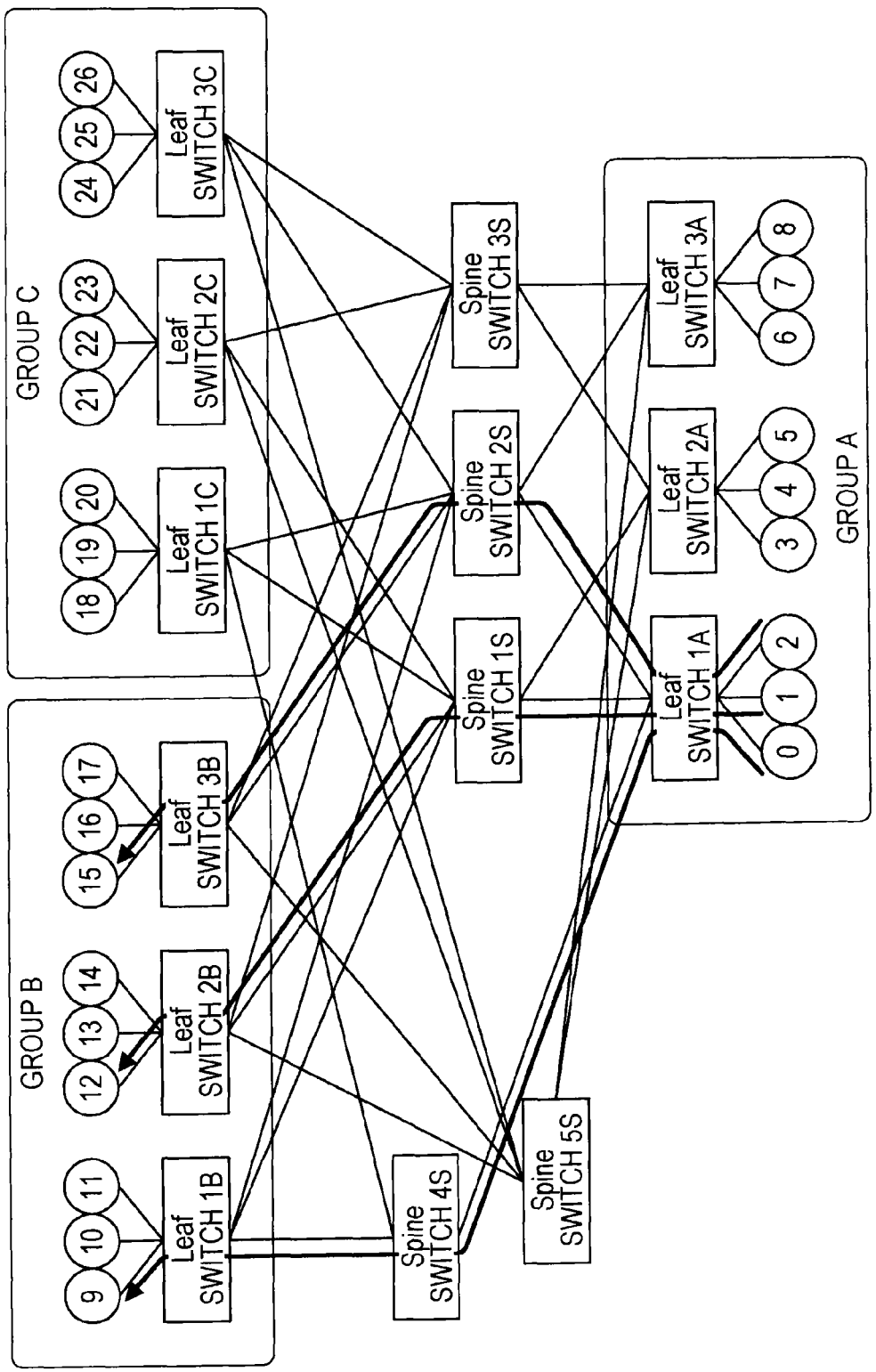
FIG. 27 is a diagram illustrating an example of communication paths for inter-group communication, according to an embodiment.
Figure 28:
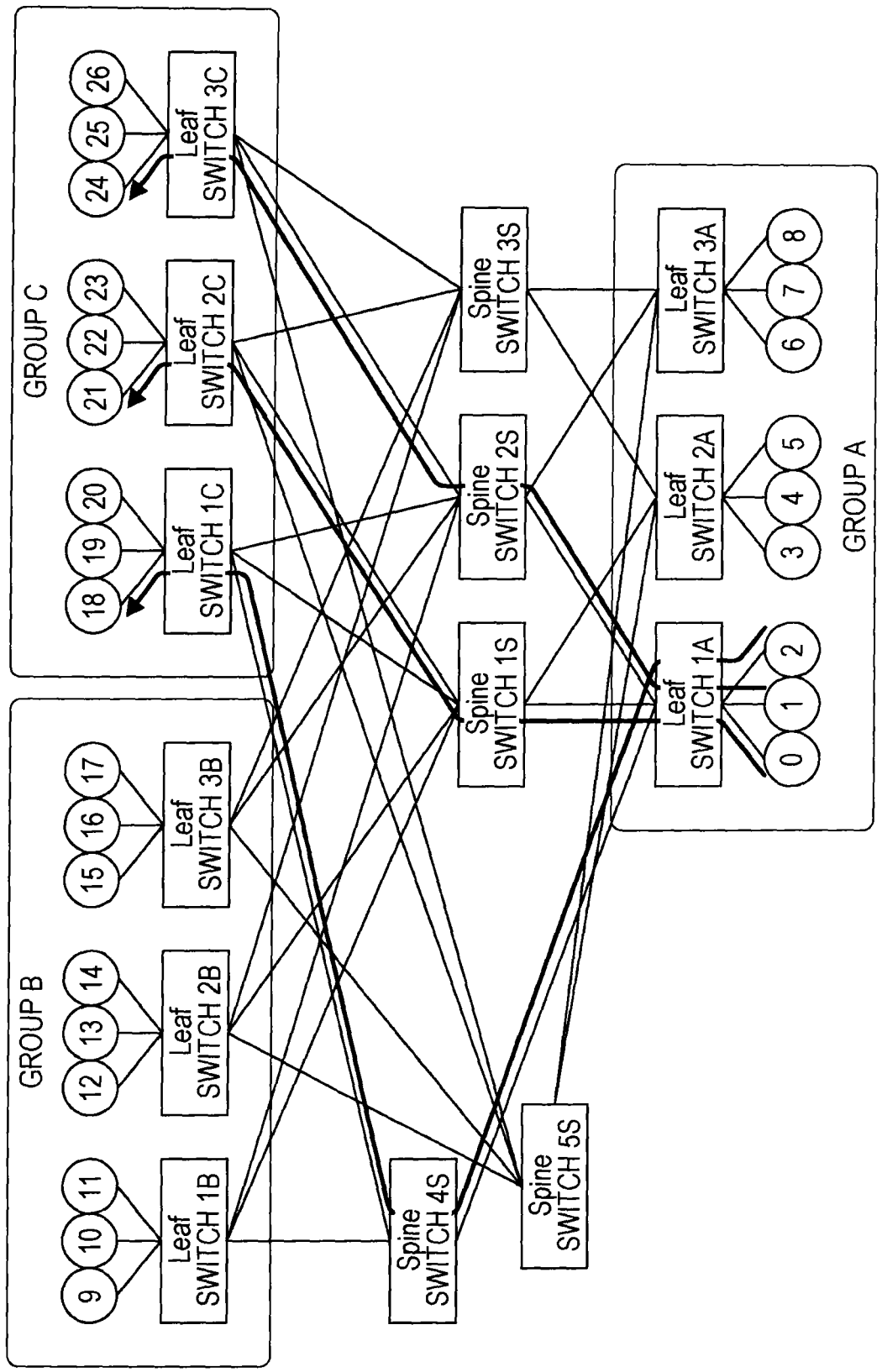
FIG. 28 is a diagram illustrating an example of communication paths for inter-group communication, according to an embodiment.

FIGS. 26 to 28 each illustrate an example of communication paths. FIG. 26 illustrates communication paths of packets each of which is transmitted by a corresponding one of the nodes 0 to 2 in the phase 18. The communication illustrated in FIG. 26 is in-group communication. A packet transmitted by the node 0 is returned to the node 0 by Leaf switch 1A. A packet transmitted by the node 1 is transferred to Spine switch 1S by Leaf switch 1A. Spine switch 1S transfers the received packet to Leaf switch 2A. Leaf switch 2A transfers the received packet to the node 3. A packet transmitted by the node 2 is transferred to Spine switch 2S by Leaf switch 1A. Spine switch 2S transfers the received packet to Leaf switch 3A. Leaf switch 3A transfers the received packet to the node 6.

In this manner, in in-group communication, out of 3 packets sent out from a Leaf switch, 1 packet is transferred to a node under the Leaf switch and 2 packets are transferred to different Leaf switches. Consequently, communication path contention does not occur.

FIG. 27 illustrates an example of communication paths of packets each of which is transmitted by a corresponding one of the nodes 0 to 2 in the phase 0. The communication illustrated in FIG. 27 is inter-group communication. A packet transmitted by the node 0 is transferred to Spine switch 4S by Leaf switch 1A. Spine switch 4S transfers the received packet to Leaf switch 1B. Leaf switch 1B transfers the received packet to the node 9. A packet transmitted by the node 1 is transferred to Spine switch 1S by Leaf switch 1A. Spine switch 1S transfers the received packet to Leaf switch 2B. Leaf switch 2B transfers the received packet to the node 12. A packet transmitted by the node 2 is transferred to Spine switch 2S by Leaf switch 1A. Spine switch 2S transfers the received packet to Leaf switch 3B. Leaf switch 3B transfers the received packet to the node 15.

In this manner, in inter-group communication, 3 packets sent out from a Leaf switch are transferred to different Leaf switches. Consequently, communication path contention does not occur.

FIG. 28 illustrates an example of communication paths of packets each of which is transmitted by a corresponding one of the nodes 0 to 2 in the phase 12. The communication illustrated in FIG. 28 is inter-group communication. A packet transmitted by the node 0 is transferred to Spine switch 1S by Leaf switch 1A. Spine switch 1S transfers the received packet to Leaf switch 2C. Leaf switch 2C transfers the received packet to the node 21. A packet transmitted by the node 1 is transferred to Spine switch 2S by Leaf switch 1A. Spine switch 2S transfers the received packet to Leaf switch 3C. Leaf switch 3C transfers the received packet to the node 24. A packet transmitted by the node 2 is transferred to Spine switch 4S by Leaf switch 1A. Spine switch 4S transfers the received packet to Leaf switch 1C. Leaf switch 1C transfers the received packet to the node 18.

In this manner, in inter-group communication, 3 packets sent out from a Leaf switch are transferred to different Leaf switches. Consequently, communication path contention does not occur.

Figure 29:
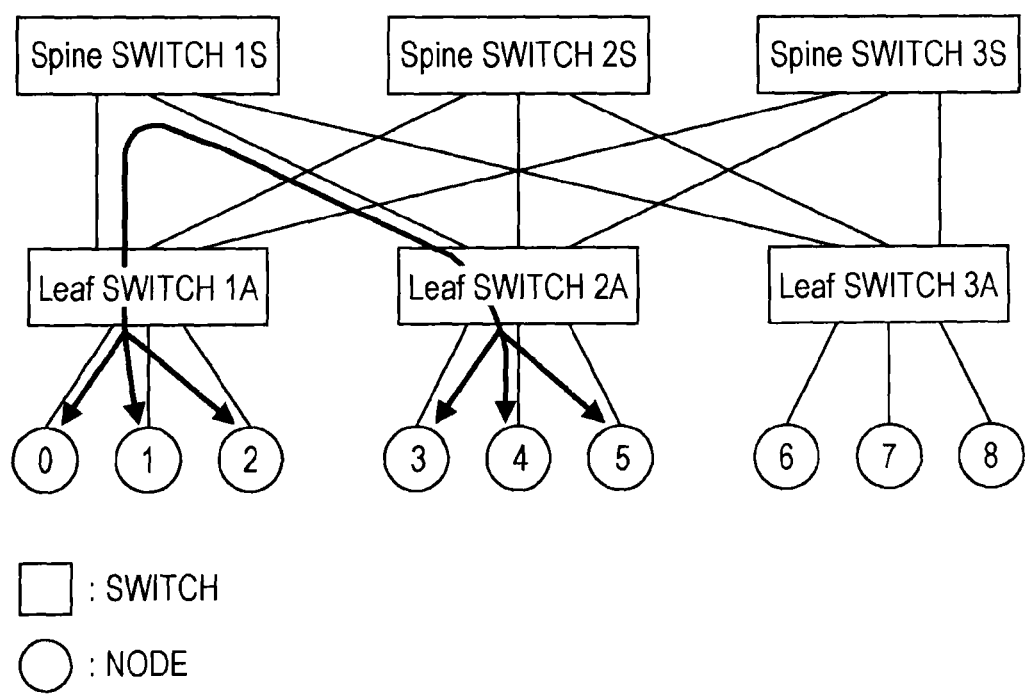
FIG. 29 is a diagram illustrating an example of improvement in communication reliability, according to an embodiment.

According to the embodiment, a Spine switch via which a forward direction packet passes through is the same as a Spine switch via which a reverse direction packet passes through. For example, when communication is performed between a node under Leaf switch 1A and a node under Leaf switch 2A as illustrated in FIG. 29, Spine switch 1S is used and other Spine switches are not used.

For example, in the case where different Spine switches are used in a forward direction and a reverse direction, breakdown of either one of the Spine switches results in a communication failure. However, in the embodiment, since only 1 Spine switch is used, reliability of communication may be improved.

The difference between an extended type full mesh topology and other network topologies will be described with reference to FIGS. 30 to 32.

Figure 30:
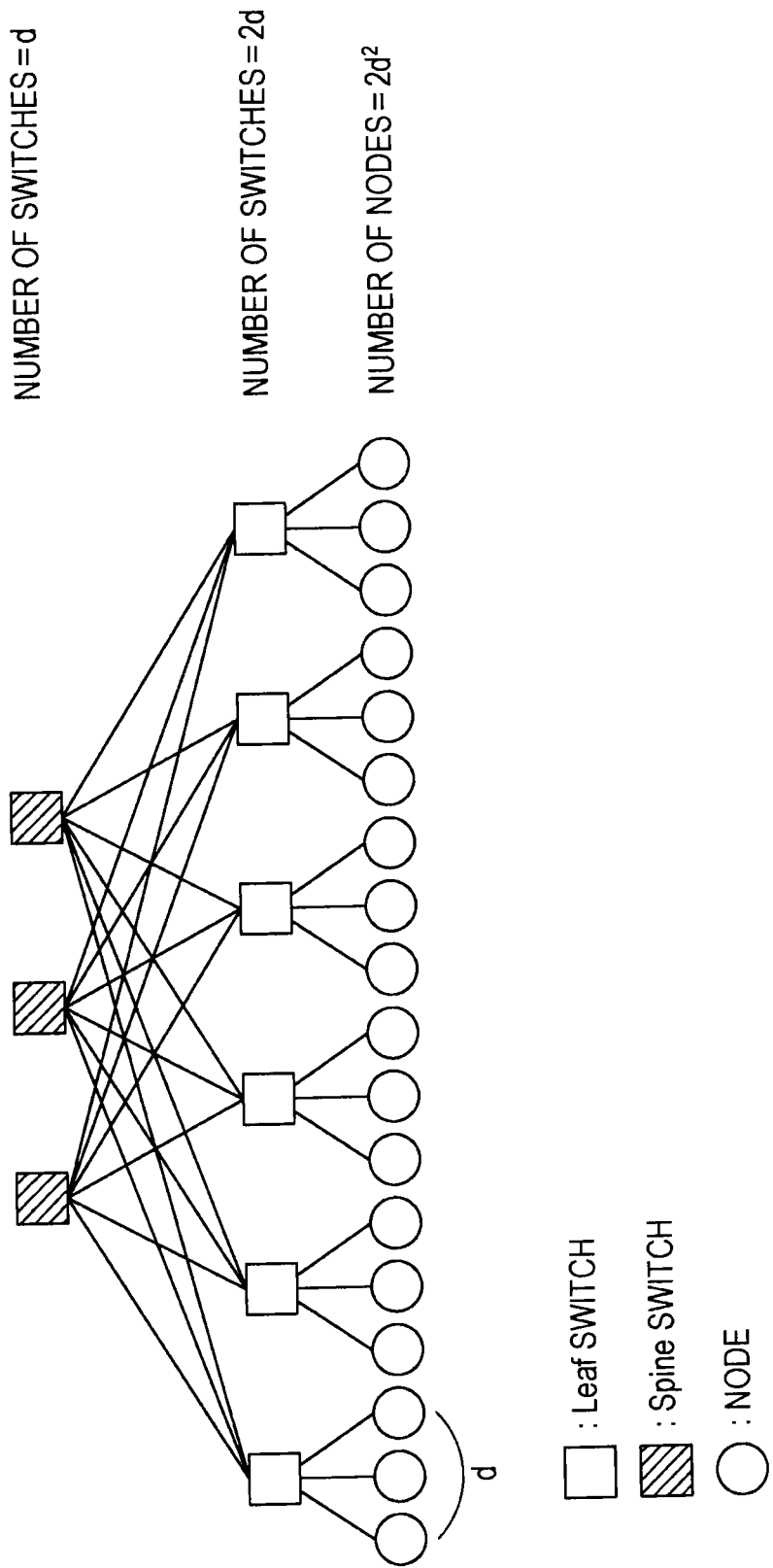
FIG. 30 is a diagram illustrating an example of a two-layer fat tree type network topology, according to an embodiment.

FIG. 30 illustrates an example of a two-layer fat tree type network topology. In FIG. 30, each of shaded square shapes indicates a Spine switch, each of unshaded square shapes indicates a Leaf switch, and each of circular shapes indicates a node. The number of nodes connected to each Leaf switch is d (here, d=3). The number of nodes in the system is $2d^2$. The number of Leaf switches is 2d. The number of Spine switches is d. Therefore, the total number of switches is 2d+d=3d. The number of nodes per switch is $2d^2/3d=2d/3$.

Figure 31:
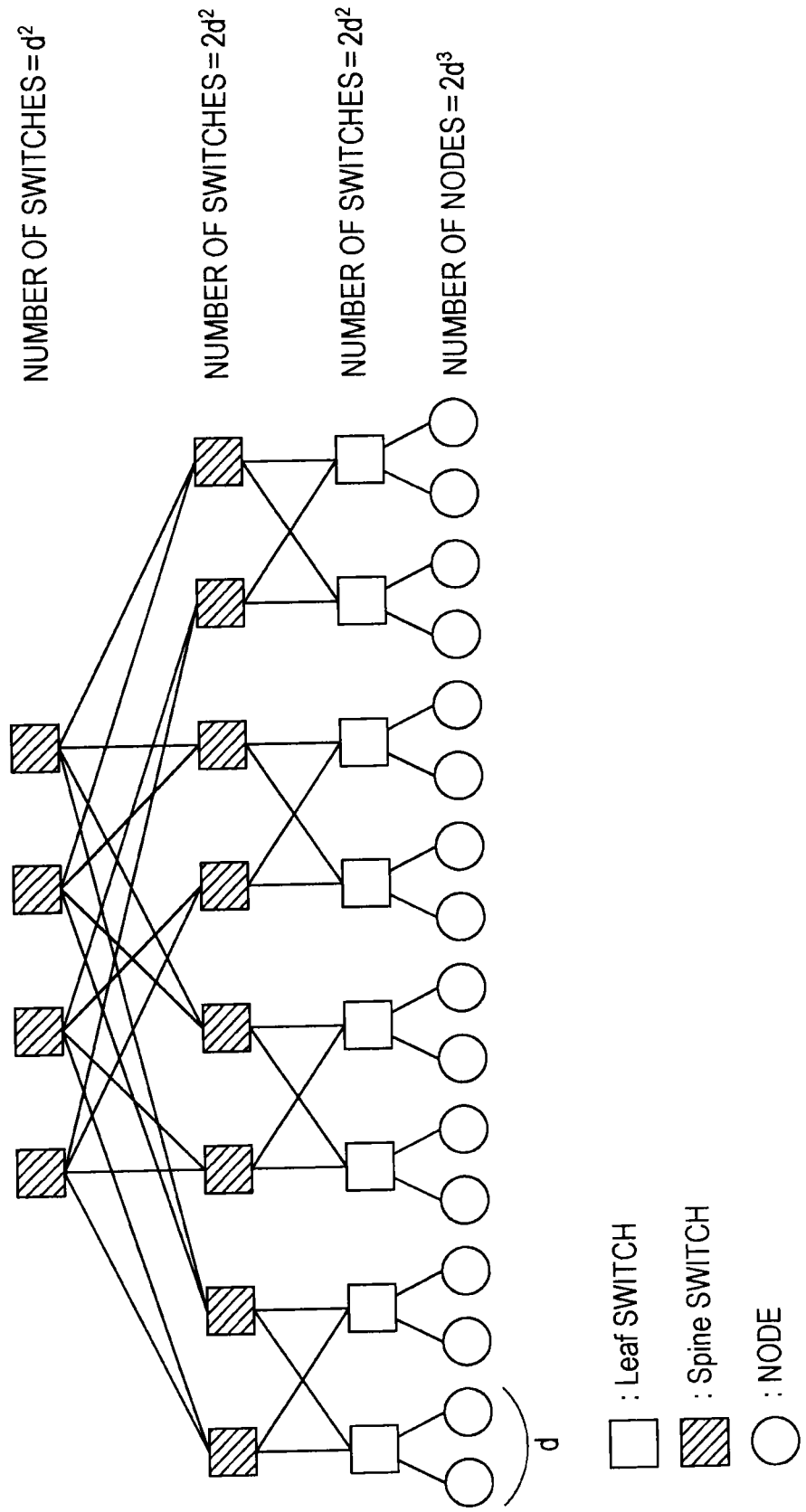
FIG. 31 is a diagram illustrating an example of a three-layer fat tree type network topology, according to an embodiment.

FIG. 31 illustrates an example of a three-layer fat tree type network topology. In FIG. 31, each of shaded square shapes indicates a Spine switch, each of unshaded square shapes indicates a Leaf switch, and each of circular shapes indicates a node. The number of nodes connected to each Leaf switch is d (here, d=2). The number of nodes in the system is $2d^3$. The number of Leaf switches is $2d^2$. The number of Spine switches disposed in the layer immediately above Leaf switches is $2d^2$. The number of Spine switches in the top layer is $d^2$. Therefore, the total number of switches is $2d^2+2d^2+d^2=5d^2$. The numbers of nodes per switch is $2d^3/5d^2=2d/5$.

FIG. 32 illustrates an example of a table for comparing values related to the extended type full mesh topology with values related to other network topologies. As illustrated in FIG. 32, the number of switches in the extended type full mesh topology is on the same order as the number of switches in the three-layer fat tree type network topology. The number of nodes per switch in the extended type full mesh topology is the same as that in the two-layer fat tree type network topology. The number of hops in a worst case in the extended type full mesh topology is the same as that in the two-layer fat tree type network topology but is superior to that in the three-layer fat tree type network topology.

Third Embodiment

In a third embodiment, a multi-layer full mesh topology will be described, which is a developed form of the full mesh topology in the first embodiment.

Figure 33:
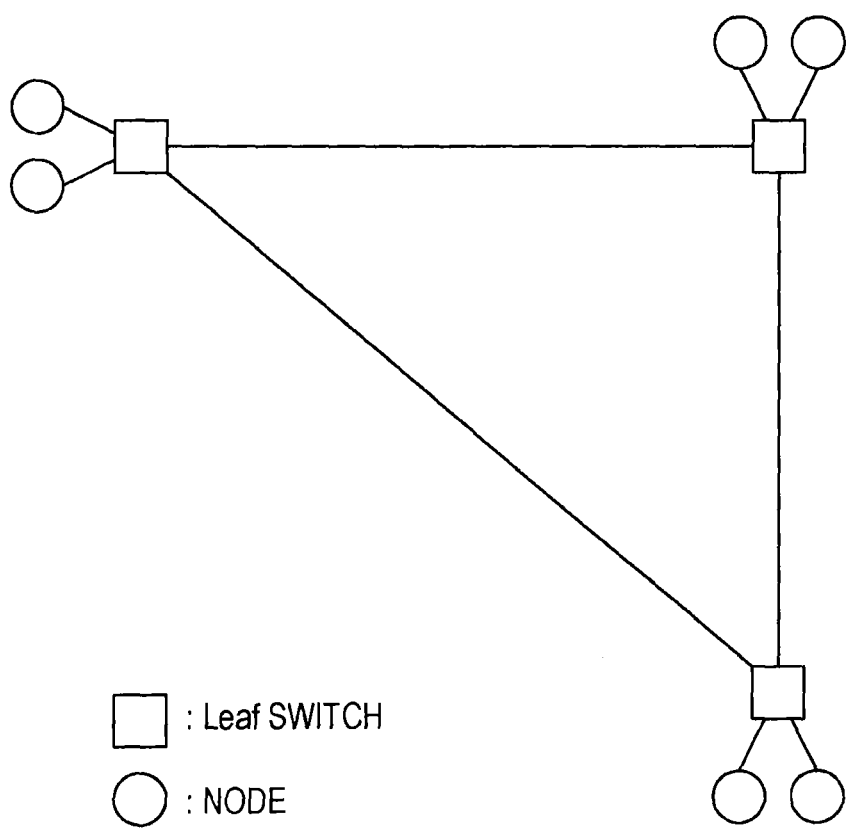
FIG. 33 is a diagram illustrating an example of a full mesh system, according to an embodiment.

First, a full mesh system as illustrated in FIG. 33 is reviewed. In FIG. 33, each of square shapes indicates a Leaf switch, and each of circular shapes indicates a node. Each Leaf switch is connected to each of other Leaf switches. Each Leaf switch is connected to 2 nodes. In the example of FIG. 33, each Leaf switch has 4 ports and has no available port.

Figure 34:
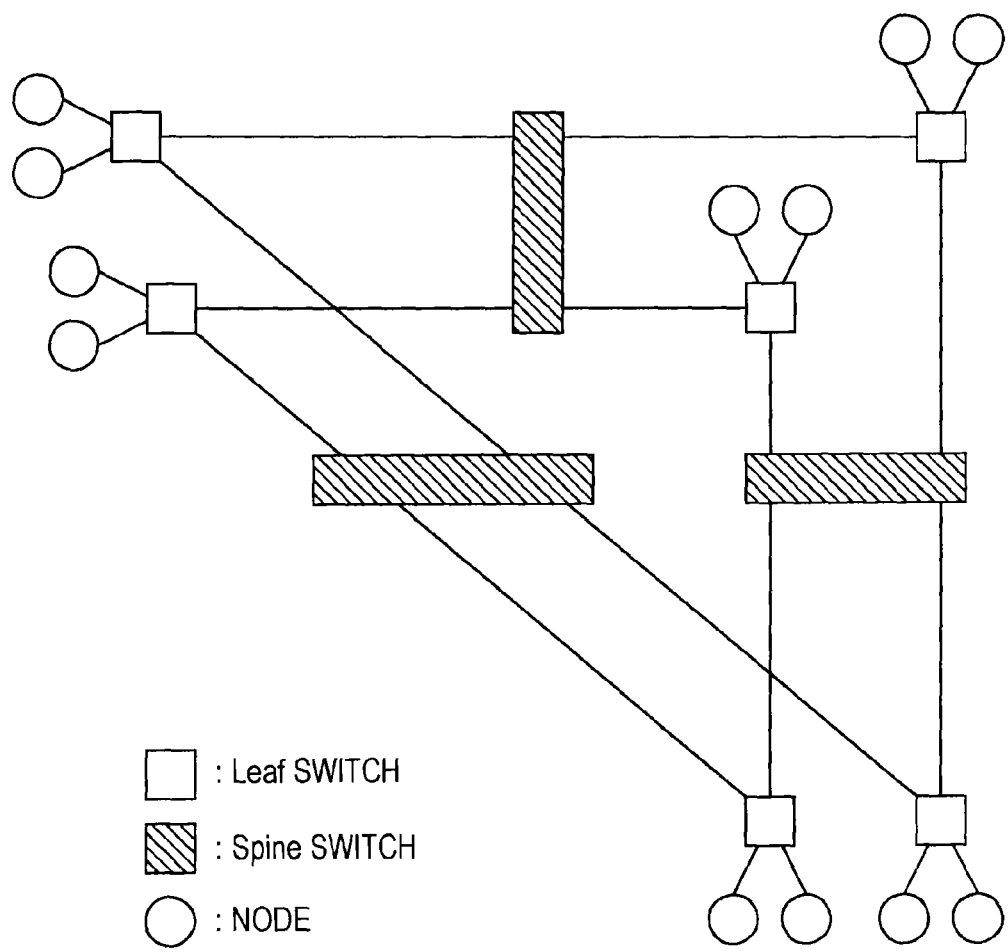
FIG. 34 is a diagram illustrating an example of a system in which 2 full mesh systems are connected, according to an embodiment.

FIG. 34 illustrates an example of a system in which 2 full mesh systems are connected. In FIG. 34, each of shaded rectangular shapes indicates a Spine switch, each of unshaded square shapes indicates a Leaf switch, and each of circular shapes indicates a node. Since two full mesh systems are connected using Spine switches, communication may be performed not only within a full mesh system but also between full mesh systems. Hereinafter, a system in which a plurality of full mesh systems are connected is referred to as a multi-layer full mesh system. The network topology of a multi-layer full mesh system is referred to as a multi-layer full mesh topology.

Figure 35:
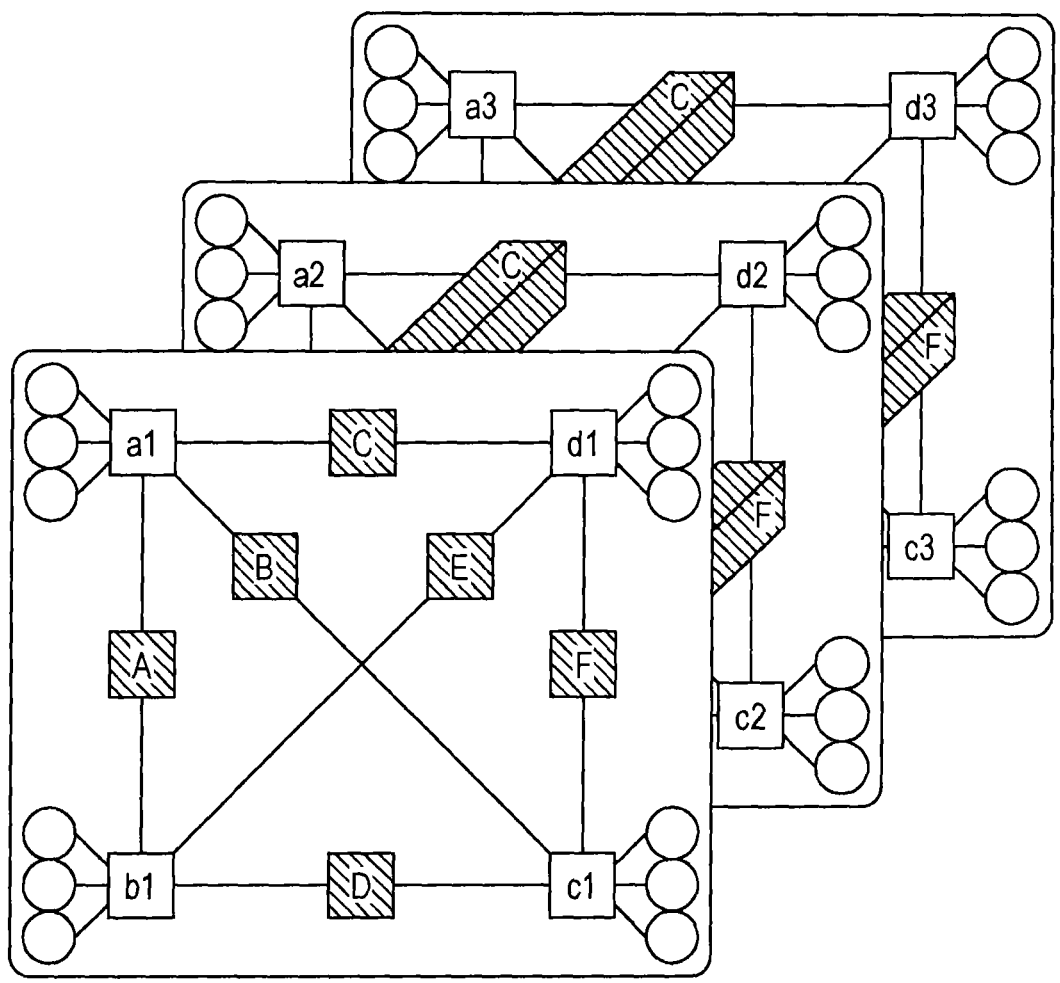
FIG. 35 is a diagram illustrating an example of a system in which full mesh systems each having 4 Leaf switches are connected, according to an embodiment.
Figure 36:
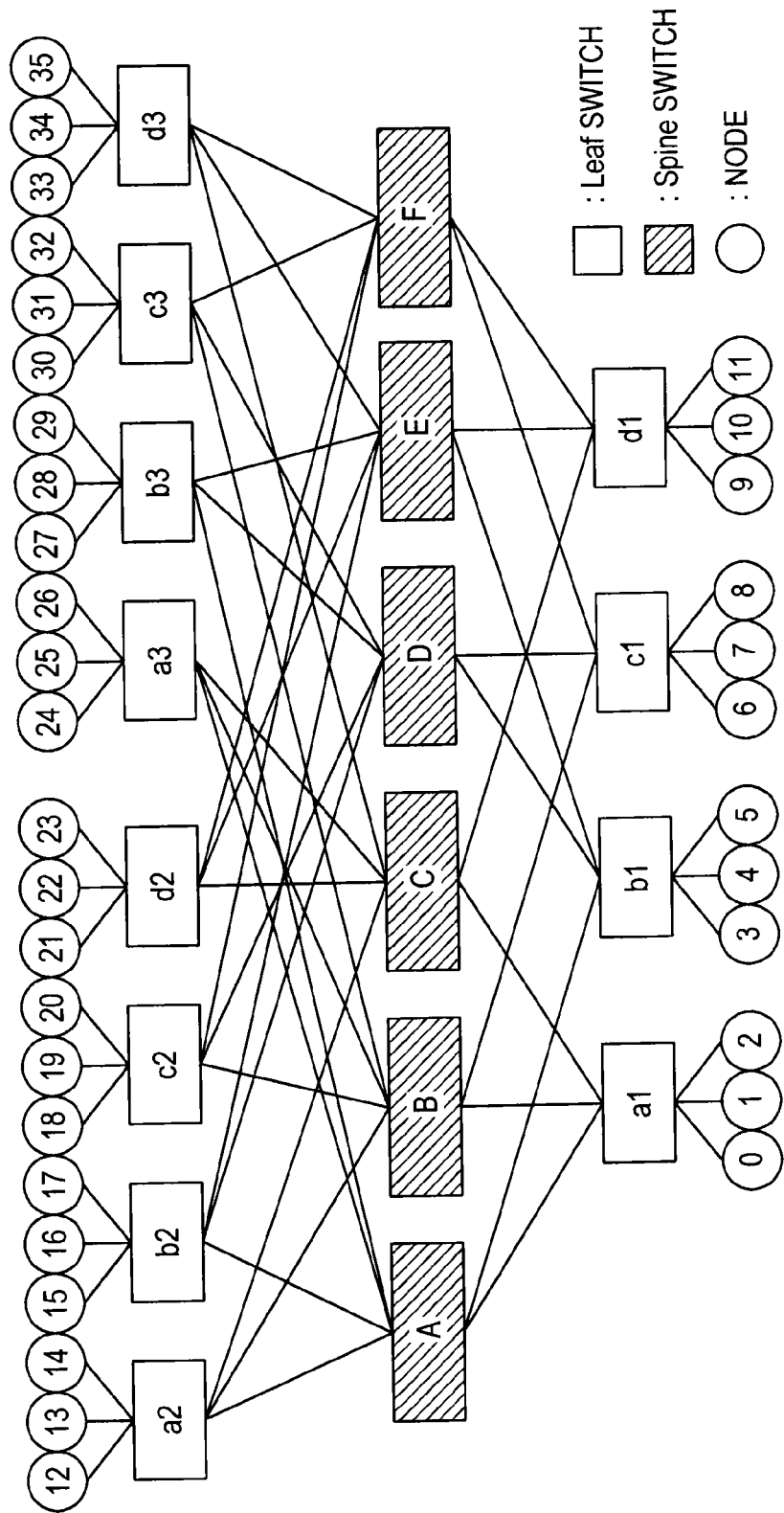
FIG. 36 is a diagram illustrating a system that has the same connection configuration as the system of FIG. 34, according to an embodiment.

FIG. 35 illustrates another example of a multi-layer full mesh system. In FIG. 35, 3 full mesh systems each including 4 Leaf switches are connected using Spine switches A to F. Each of shaded square shapes indicates a Spine switch, each of unshaded square shapes indicates a Leaf switch, and each of circular shapes indicates a node. The number of ports of each Spine switch and the number of ports of each Leaf switch are each 6. Each Leaf switch is connected to 3 nodes. A Spine switch is provided on the link between Leaf switches. Each Spine switch has 2 links in each full mesh system and is connected to 2 Leaf switches in each full mesh system. Illustrating the system of FIG. 35 in a different manner gives FIG. 36. The connection configuration of FIG. 36 is exactly the same as the connection configuration of FIG. 35. The number in each circular shape is a node number assigned to a node indicated by the each circular shape.

Hereinafter, all-to-all communication performed by the nodes 0 to 35 in FIG. 36 will be described.

Figure 37:
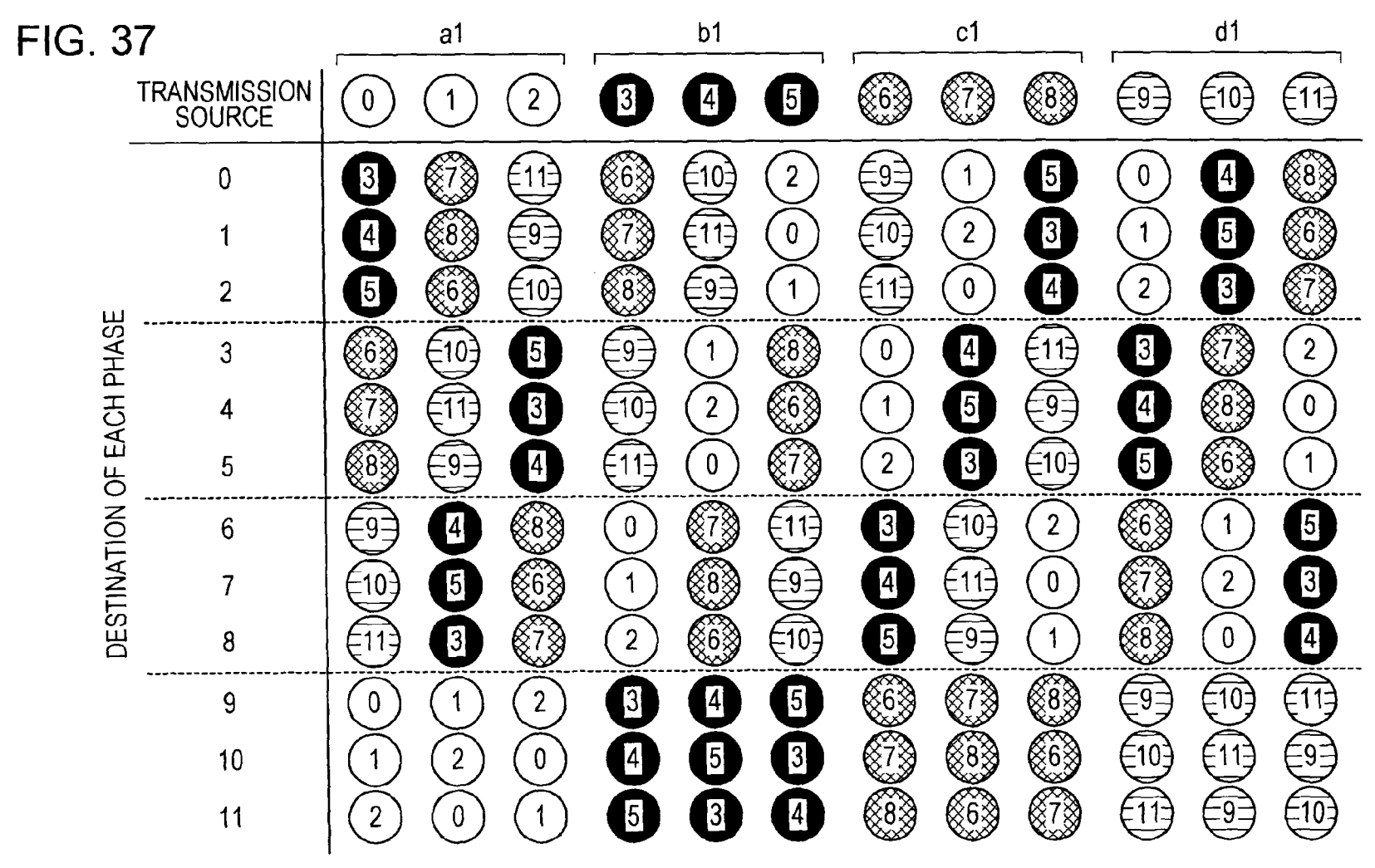

First, the communication in the phases 0 to 11 will be described with reference to FIG. 37. FIG. 37 illustrates the number assigned to a destination node of each of the nodes 0 to 11 over the phases 0 to 11.

The destination D in the phases 0 to 8 (in more general, phase 0 to (d*d−1)) is determined, for example, by D=((sg+(o+pb) % d+1) % (d+1))*d+(o+i) % d. The number dg assigned to the group to which a destination node belongs is determined, for example, by dg=(sg+(o+pb) % d+1)% (d+1), where a group is defined as a plurality of nodes connected to the same Leaf switch, d is a degree indicating the number of nodes connected to each Leaf switch, g is the number of groups which is given by g=d+1, s is the number assigned to a transmission source node, sg is the number assigned to the group to which the transmission source node belongs, which is given by sg=s/d, o is an offset within the group of transmission source nodes, which is given by o=s % d, i is the number assigned to a phase, and pb is the number assigned to a phase block, which is given by pb=i/d. As seen from the FIG. 37, in the phases 0 to 8, 3 packets sent out from one Leaf switch are transferred to different Leaf switches. Consequently, communication path contention does not occur.

The destination in the phases 9 to 11 (in more general, phase (d*d) to (d*(d+1)−1) is determined, for example, by dest=(sg*d)+(o+i) % d. In the phases 9 to 11, a Leaf switch, upon receiving a packet from a node connected to the Leaf switch, transfers the received packet within the Leaf switch, and thus communication path contention does not occur.

As described above, in the phases 0 to 11, communication within layer is performed in which nodes under Leaf switches a1, b1, c1, and d1, each transmit a packet to the nodes under Leaf switches a1, a1, b1, c1, and d1. In the communication within layer, setting each destination as illustrated in FIG. 37 enables communication path contention to be avoided.

Similarly, in the phases 0 to 11, communication within layer is performed in which nodes under Leaf switches a2, b2, c2, and d2, each transmit a packet to the nodes under Leaf switches a2, b2, c2, and d2. In addition, communication within layer is performed in which the nodes under Leaf switches a3, b3, c3, and d3, each transmit a packet to the nodes under Leaf switches a3, b3, c3, and d3. In this communication within layer, setting each destination similarly to the communication within layer in the phases 0 to 11 enables communication path contention to be avoided.

Figure 38:
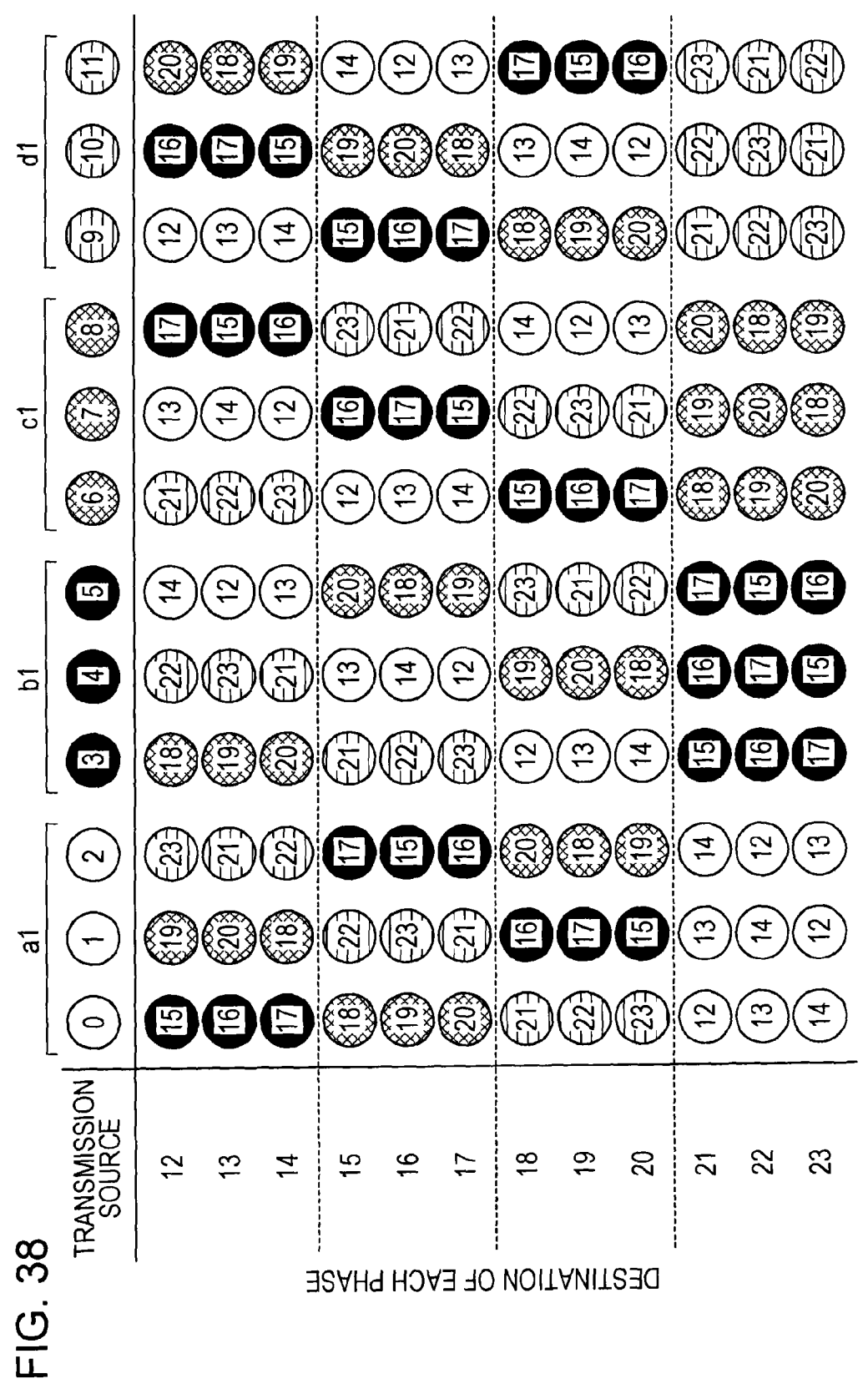

The communication in the phases 12 to 23 will be described with reference to FIG. 38. FIG. 38 illustrates the number assigned to a destination node of each of the nodes 0 to 11 over the phases 12 to 23.

In the phases 12 to 23, inter-layer communication is performed in which nodes under Leaf switches a1, b1, c1, and d1, each transmit a packet to nodes under Leaf switches a2, b2, c2, and d2. The number assigned to each destination node in any one of the phases 12 to 23 is obtained by adding 12 to the number assigned to the corresponding destination node of the phases 0 to 11. Thus, in the phases 12 to 20, 3 packets sent out from one Leaf switch are transferred to different Leaf switches. In the phases 21 to 23, 3 packets sent out from one Leaf switch are destined for the same Leaf switch. However, communication paths to the Leaf switch are made different (that is, the packets are transmitted via different Spine switches), and thus communication path contention does not occur. Consequently, communication path contention may be avoided.

Similarly, in the phases 12 to 23, inter-layer communication is performed in which nodes under Leaf switches a2, b2, c2, and d2, each transmit a packet to nodes under Leaf switches a3, b3, c3, and d3. In addition, inter-layer communication is performed in which nodes under Leaf switches a3, b3, c3, and d3, each transmit a packet to nodes under Leaf switches a1, b1, c1, and d1. In this inter-layer communication, setting each destination similarly to the inter-layer communication in the phases 0 to 11 enables communication path contention to be avoided.

Figure 39:
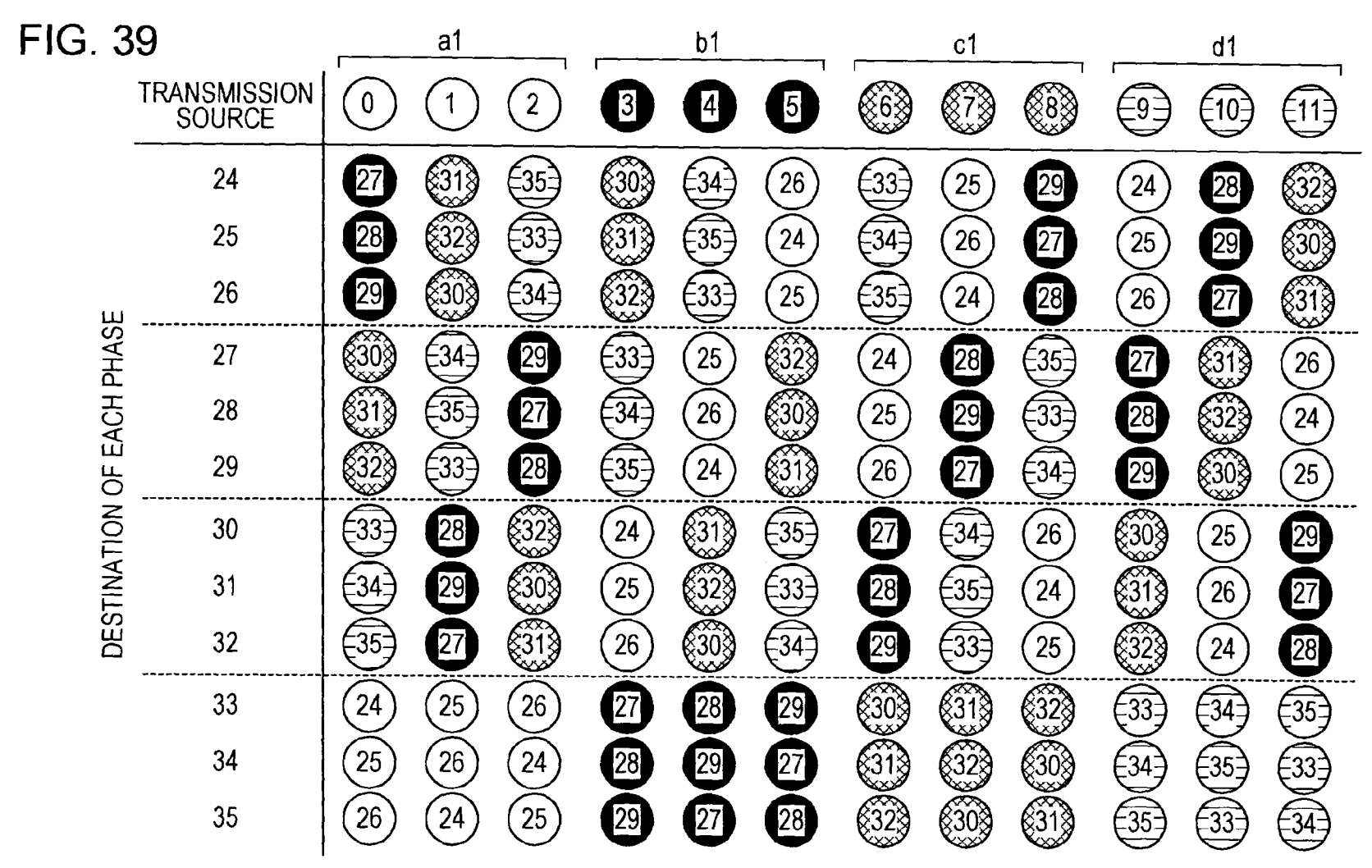

The communication in the phases 24 to 35 will be described with reference to FIG. 39. FIG. 39 illustrates the number assigned to a destination node of each of the nodes 0 to 11 over the phases 24 to 35.

In the phases 24 to 35, inter-layer communication is performed in which nodes under Leaf switches a1, b1, c1, and d1, each transmit a packet to nodes under Leaf switches a3, b3, c3, and d3. The number assigned to each destination node in any one of the phases 24 to 35 is obtained by adding 24 to the number assigned to the corresponding destination node of the phases 0 to 11. Thus, in the phases 24 to 32, 3 packets sent out from one Leaf switch are transferred to different Leaf switches. In the phases 32 to 35, 3 packets sent out from one Leaf switch are destined for the same Leaf switch. However, communication paths to the Leaf switch are made different (that is, the packets are transmitted via different Spine switches), and thus communication path contention does not occur. Consequently, communication path contention may be avoided.

Similarly, in the phases 24 to 35, inter-layer communication is performed in which nodes under Leaf switches a2, b2, c2, and d2, each transmit a packet to nodes under Leaf switches a1, b1, c1, and d1. In addition, inter-layer communication is performed in which nodes under Leaf switches a3, b3, c3, and d3, each transmit a packet to nodes under Leaf switches a2, b2, c2, and d2. In this inter-layer communication, setting each destination similarly to the inter-layer communication in the phases 0 to 11 enables communication path contention to be avoided.

As described above, even when all-to-all communication is performed in a system with multi-layer full mesh topology, communication path contention may be avoided.

It is to be noted that the process of determining a destination is performed in each node. The processing flow is essentially the same as the processing flow in other embodiments, and thus description is omitted.

Fourth Embodiment

In the second embodiment and the third embodiment, the upper limit of the number of connectable full mesh systems is ½ the number of ports of each Spine switch, and thus there is a limitation in increase of the system size. Thus, in a fourth embodiment, a method of connecting more full mesh systems will be described.

FIG. 40 illustrates an example of a multi-layer full mesh system in which 6 full mesh systems are connected. In the system of FIG. 40, each full mesh system includes 4 Leaf switches and 12 nodes. A two-layer fat tree system 400 is used for connection between full mesh systems. That is, A to F in FIG. 40 are each configured as a two-layer fat tree system 400. The fat tree system 400 includes 9 network switches, out of which 6 network switches are arranged in a lower layer and 3 network switches are arranged in an upper layer. Since the number of available ports is 12, 6 (=12/2) full mesh systems are connectable.

FIG. 41 illustrates an example of a multi-layer full mesh system in which 5 full mesh systems are connected. In the system of FIG. 41, each full mesh system includes 4 Leaf switches and 12 nodes. A full mesh system 410 including 5 network switches is used for connection between full mesh systems. That is, A to F in FIG. 41 are each configured as a full mesh system 410. Since the number of available ports of each network switch in the full mesh system 410 is 2, the total number of available ports is 10. Therefore, 5 (=10/2) full mesh systems are connectable.

However, for example when inter-layer communication in which Leaf switch a1 transfers a packet to Leaf switch a2, and inter-layer communication in which Leaf switch b1 transfers a packet to Leaf switch b2 are performed in the same phase, communication path contention occurs in the link 411. Thus, the bandwidth for communication is reduced to ½ compared with the case where no communication path contention occurs.

As described above, when the number of ports of Spine switch is not sufficient, more full mesh systems are made connectable by replacing some Spine switches with a fat tree system or a full mesh system.

Figure 42:
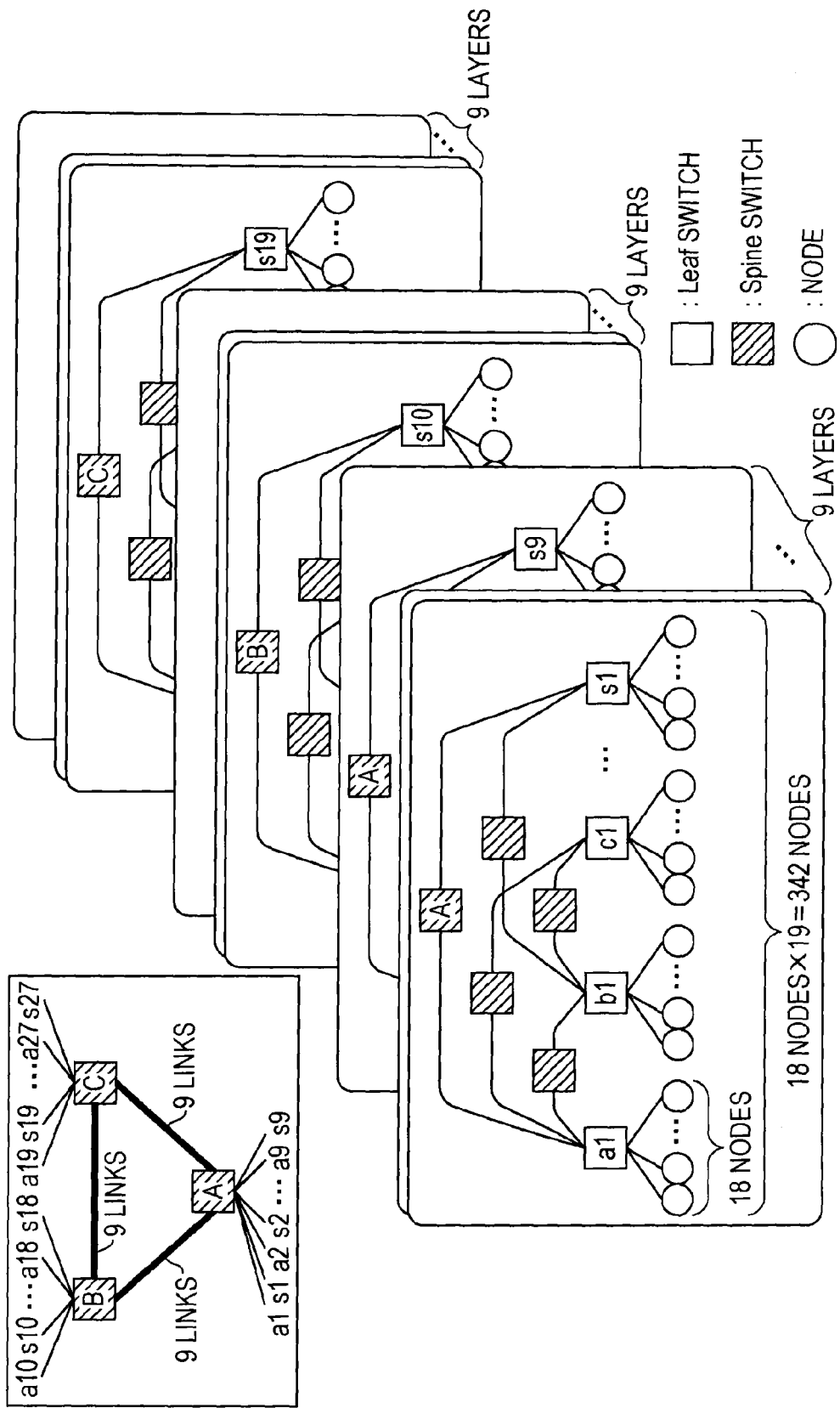
FIG. 42 is a diagram illustrating an example of a system in which 27 full mesh systems are connected, according to an embodiment.

As an example of large scale multi-layer full mesh system, FIG. 42 illustrates a multi-layer full mesh system in which 27 full mesh systems are connected. The system of FIG. 42 is a system in which 3 multi-layer full mesh systems are connected, the multi-layer full mesh system (hereinafter referred to as nine-layer full mesh system) being formed by connecting 9 full mesh systems. For connection of 9 full mesh systems, Spine switches each having 36 ports are utilized. Out of 36 ports of each Spine switch, 18 (=2*9) ports are used for connection to Leaf switches and remaining 18 ports are used for connection to the Spine switches in other nine-layer full mesh systems. For example, in FIG. 42, 9 ports out of the ports of Spine switch A are used for connection to Spine switch B, and 9 ports out of the ports of Spine switch A are used for connection to Spine switch C.

The number of ports of each Leaf switch is 36. Out of 36 ports, 18 ports are used for connection to nodes, and remaining 18 ports are used for connection to other Leaf switches or Spine switches. Thus, each full mesh system includes 19 Leaf switches and 342 (=18*19) nodes. Therefore, the total number of nodes is 9234 (=342*27).

When Spine switches are used in a straightforward manner, only 18 (=36/2) full mesh system are connectable and the total number of nodes is 6156 (=342*18). Consequently, more nodes are connectable using the configuration of FIG. 42. The total number of network switches is 972 which is smaller than the number of network switches in a three-layer fat tree system, that is, 1283.

Next, all-to-all communication in the system of FIG. 42 will be discussed. First, when communication is performed within a nine-layer full mesh system, communication path contention may be avoided by setting destinations in accordance with the manner as described in the third embodiment.

On the other hand, when communication is performed between nine-layer full mesh systems, communication path contention may occur. For example, suppose that in a certain phase, each node under Leaf switch a1 transmits a packet to one of the nodes under Leaf switch a10 and each node under Leaf switch s1 transmits a packet to one of the nodes under Leaf switch s10. Similarly, suppose that each node under Leaf switch a2 transmits a packet to one of the nodes under Leaf switch a11 and each node under Leaf switch s2 transmits a packet to one of the nodes under Leaf switch s11, and so forth, and each node under Leaf switch a9 transmits a packet to one of the nodes under Leaf switch a18 and each node under Leaf switch s9 transmits a packet to one of the nodes under Leaf switch s18. In this case, 324 (=18*2*9) packets are transmitted through 162 (=9*18) links between nine-layer full meshes. Thus, the bandwidth for communication is reduced to ½ (=162/324) compared with the case where no communication path contention occurs. It is to be noted that when all-to-all communication is performed, the number of nodes where no communication path contention occurs is 3078.

Although the embodiments of the present disclosure have been described above, the present disclosure is not limited to these. For example, the above-described functional block configuration of the nodes 0 to 35 may not match actual configuration of program modules.

Also, the configuration of each table described above is an example and each table does not have to adopt the above configuration. Furthermore, as long as the result of processing is not affected, the order of the processes in the processing flow may be changed. In addition, the processes may be performed in parallel.

In the first and second embodiments, an example with d=3 has been described. However, the condition is not limited to d=3. For example, d may be 4 or greater.

Figure 43:
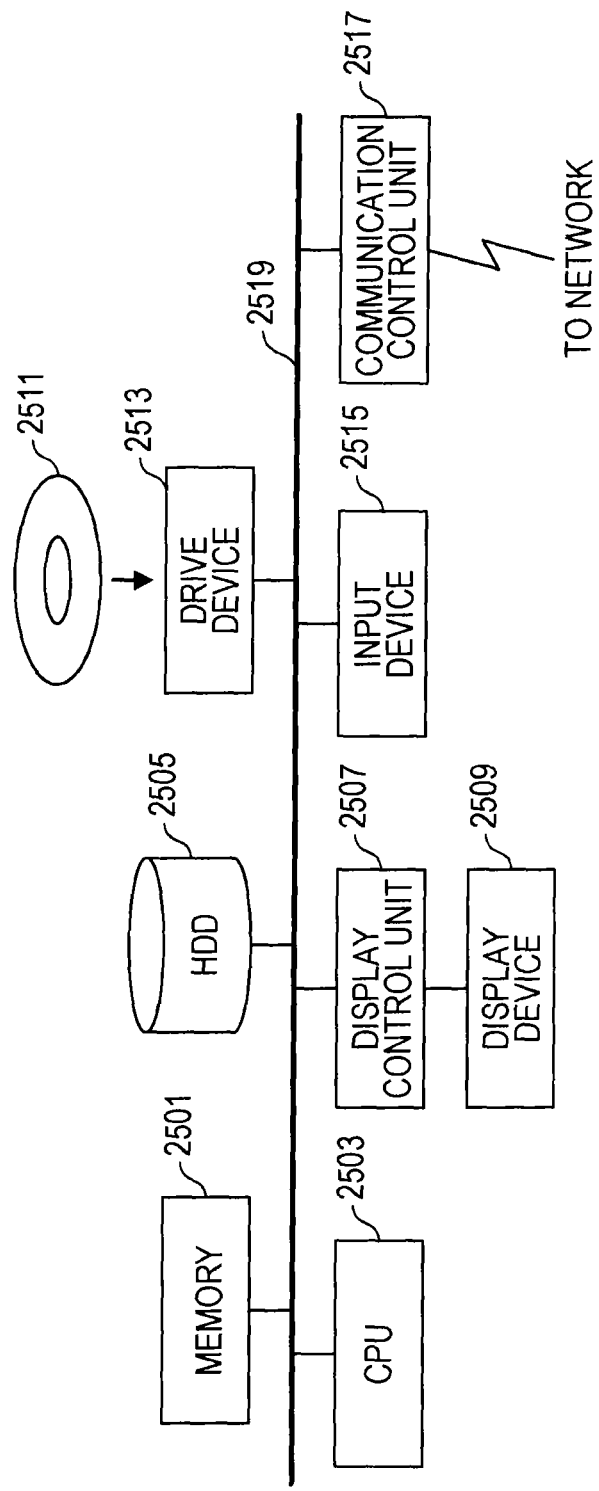
FIG. 43 is a diagram illustrating an example of a configuration of a computer, according to an embodiment.

It is to be noted that the nodes 0 to 35 described above are each a computer apparatus, and as illustrated in FIG. 43, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for connection to a network are connected to one another via a bus 2519. An operating system (OS) and application programs for performing the processing in the embodiment are stored in HDD 2505, and are read from the HDD 2505 to the memory 2501 when executed by the CPU 2503. The CPU 2503 controls the display control unit 2507, the communication control unit 2517, and the drive device 2513 according to the processing code of an application program and causes these units to execute predetermined operations. Although data during processing is mainly stored in the memory 2501, the data may be stored in the HDD 2505. In the embodiment of the present disclosure, an application program for performing the above-described processing is stored and distributed to the computer-readable removable disk 2511, then installed to the HDD 2505 from the drive device 2513. The application program may be installed to the HDD 2505 via a network such as the Internet and the communication control unit 2517. Such a computer apparatus achieves the above-described various functions by systematic cooperation between hardware such as the CPU 2503, the memory 2501 and programs such as OS and an application program mentioned above.

The following is the summary of the embodiments of the disclosure described above.

A parallel computer system according to a first aspect of the embodiment includes (A) a plurality of network switches each of which is directly connected to each of other network switches, and (B) a plurality of nodes each of which is connected to one of the network switches. (a1) Each of the network switches is connected to two or more nodes. Each of the nodes includes (b1) a determination unit that determines a destination node of data transmitted at a given time so that the network switch connected to a destination node of data transmitted by the node is different from the network switch connected to a destination node of data transmitted by any of the two or more nodes, other than the node, connected to the network switch which is connected to the node, and (b2) a transmission unit that transmits data to the destination node determined by the determination unit.

In this manner, frequent routing of data through a particular communication path may be avoided, the data being sent from a network switch, and thus communication path contention is avoidable in collective communication.

In addition, (b3) the plurality of nodes may perform all-to-all communication. Communication path contention may be avoided in the all-to-all communication.

The condition may be set such that (a2) the number of nodes connected to each of the network switches is a predetermined number d, (a3) the number of the network switches is the predetermined number d, and (b4) the number of the nodes is $d^2$. In this manner, communication path contention may be avoided and the network switches are effectively utilized.

The determination unit may calculate (b11) $(d*o+(s+(o+i/d+i)\%d)\%d)+d*(i/d))\%d^2$ and determine a destination at time i to be the node with a node number having the calculated value, where s is the node number assigned to a node, i is the number indicating a time, o is a predetermined offset value, and % is the modulus operator.

The determination unit may calculate (b12) $((s\%d)*d+(i+o)\%d+(i/d)*d)\%d^2$ and determine a destination at time i to be the node with a node number having the calculated value, where s is the node number assigned to a node, i is the number indicating a time, o is a predetermined offset value, and % is the modulus operator.

The determination unit may calculate $((s/d+(s \% d+i/d) \% (d+1)\% (d+1))*d+(s \% d+i)) \% d$ for i satisfying $0 \le i \le d*d-1$ and determine a destination at time i to be the node with a node number having the calculated value, and may calculate $(s/d*d)+(s \% d+i) \% d$ for i satisfying $d*d \le i \le d*(d+1)-1$ and determine a destination at time i to be the node with a node number having the calculated value, where d is the number of nodes connected to each of the network switches, s is the node number assigned to a node, i is the number indicating a time, and % is the modulus operator.

A parallel computer system according to a second aspect of the present embodiment includes (C) a plurality of first network switches, (D) a plurality of second network switches each of which is connected to at least two network switches out of the first network switches, and (E) a plurality of nodes each of which is connected to one of the first network switches. (c1) Each of the first network switches is connected to two or more nodes, and (c2) any two network switches out of the first network switches are connected via one of the second network switches. Each of the nodes described above includes (e1) a determination unit that determines a destination node of data transmitted at a given time so that the network switch connected to a destination node of data transmitted by the node is different from the network switch connected to a destination node of data transmitted by any of the two or more nodes, other than the node, connected to the network switch which is connected to the node, and (e2) a transmission unit that transmits data to the destination node determined by the determination unit.

In this manner, frequent routing of data through a particular communication path may be avoided, the data being sent from a network switch, and thus communication path contention is avoidable in collective communication.

For each of the first network switches described above, (c3) when a destination node of data is connected to the network switch, the data being received from a node connected to the network switch, the network switch may transmit the received data to the destination node of the received data, and (c4) when a destination node of data is not connected to the network switch, the data being received from a node connected to the network switch, the network switch may transmit the received data to another network switch that connects the network switch and a network switch connected to the destination node of the received data, the another network switch being one of the second network switches. In this manner, the data received by the node is properly transferred.

In addition, (e3) the nodes may perform all-to-all communication. Communication path contention may be avoided in the all-to-all communication.

The condition may be set such that (c5) the number of nodes connected to each of the first network switches is a predetermined number d, (e4) the number of the nodes is $d^3$, (c6) the number of the first network switches is $d^2$, and (d1) the number of the second network switches is the sum of $d/2(d-1)$ and an integer to which $d/2$ is rounded up. In this manner, communication path contention may be avoided and the network switches are effectively utilized.

(e5) The nodes may belong to one of a plurality of groups, and the determination unit may calculate (e12) $((s \% d)*d+(i+o) \% d+(i/d)*d) \% d^2+g$ and determine a destination at time i to be the node with a node number having the calculated value, where g is the number assigned to a group to which a node belongs, s is the node number assigned to the node, i is the number indicating a time, o is a predetermined offset value, and % is the modulus operator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system, comprising:
a plurality of network switches in which each network switch of the plurality of network switches is directly connected to each other network switch of the plurality of network switches; and
a plurality of nodes in which each node of the plurality of nodes is directly connected to only one network switch of the plurality of network switches, wherein
each network switch of the plurality of network switches is directly connected to two or more nodes of the plurality of nodes; and
each node of the plurality of nodes is configured to:
determine a first destination node of data, to be transmitted by the node performing the determination, at a given time so that a first destination network switch is different from a second network switch, the first destination network switch being a network switch of the plurality of network switches directly connected to the first destination node, the second network switch being a network switch of the plurality of network switches directly connected to a second destination node of data transmitted by a source node of the plurality of nodes other than the node performing the determination, and the source node being directly connected to a source network switch that is a network switch of the plurality of network switches to which the node performing the determination is directly connected; and
transmit the data to the determined first destination node, wherein
a number of nodes directly connected to each network switch of the plurality of network switches is a predetermined number of d, d being a positive integer equal to 1 or more,
a number of the plurality of network switches is the predetermined number of d, and
a number of the plurality of nodes is $d^2$.

2. The parallel computer system of claim 1, wherein the plurality of nodes perform all-to-all communication among the plurality of nodes.

3. The parallel computer system of claim 1, wherein
a consecutive node number is assigned to each node of the plurality of nodes, according to a predetermined connection relationship between the plurality of nodes and the plurality of network switches,
each node calculates a destination node number according to a calculation expression of $(d*o+(s+(o+i/d+i) \% d) \% d)+d*(i/d)) \% d^2$, where s is a node number assigned to the node performing the calculation, s being a positive integer equal to 1 or more, i is a number indicating a time and being a positive integer equal to 1 or more, o is a predetermined offset value that is determined based on the predetermined connection relationship and being a positive integer equal to 1 or more, and % is modulus operator, and each node determines, as the first destination node at time i, a node with the calculated destination node number.

4. The parallel computer system of claim 1, wherein a consecutive node number is assigned to each node of the plurality of nodes, according to a predetermined connection relationship between the plurality of nodes and the plurality of network switches, each node calculates a destination node number according to a calculation expression of $((s \% d)*d+(i+o) \% d+(i/d)*d) \% d^2$, where s is a node number assigned to the node performing the calculation, s being a positive integer equal to 1 or more, i is a number indicating a time and being a positive integer equal to 1 or more, o is a predetermined offset value that is determined based on the predetermined connection relationship and being a positive integer equal to 1 or more, and % is modulus operator, and each node determines, as the first destination node at time i, a node with the calculated destination node number.

5. The parallel computer system of claim 1, wherein a consecutive node number is assigned to each node of the plurality of nodes, according to a predetermined connection relationship between the plurality of nodes and the plurality of network switches, each node calculates a destination node number according to a calculation expression of $((s/d+(s \% d+i/d) \% d+1)\% (d+1))*d+(s \% d+i) \% d$, ford satisfying $0 \leq i \leq d*d-1$, and according to a calculation expression of $(s/d*d)+(s \% d+i) \% d$ for i satisfying $d*d \leq i \leq d*(d+1)-1$, where d is a number of nodes connected to each network switch of the plurality of network switches and being a positive integer equal to 1 or more, s is a node number assigned to the node performing the calculation, s being a positive integer equal to 1 or more, i is a number indicating a time and being a positive integer equal to 1 or more, and % is modulus operator, and each node determines, as the first destination node at time i, a node with the calculated destination node number.

6. The parallel computer system of claim 1, wherein each node of the plurality of nodes is connected to only one network switch of the first plurality of first network switches.

7. A parallel computer system, comprising:

a first plurality of first network switches;

a second plurality of second network switches in which each network switch of the second plurality of second network switches is directly connected to at least two network switches out of the first plurality of first network switches; and a plurality of nodes in which each node of the plurality of nodes is directly connected to only one network switch of the first plurality of first network switches, wherein each network switch of the first plurality of first network switches is directly connected to two or more nodes of the plurality of nodes, any two network switches out of the first plurality of first network switches are connected via one network switch of the second plurality of second network switches, and each node of the plurality of nodes is configured to:

determine a first destination node of data, to be transmitted by the node performing the determination, at a given time so that a first destination network switch is different from a second network switch, the first destination network switch being directly connected to the first destination node, the second network switch being directly connected to a second destination node of data transmitted by a source node of the plurality of nodes other than the node performing the determination, and the source node being directly connected to a third network switch to which the node performing the determination is directly connected; and transmit the data to the determined first destination node, wherein a number of nodes directly connected to each network switch of the plurality of network switches is a predetermined number of d, d being a positive integer equal to 1 or more, a number of the plurality of nodes is $d^3$, a number of the plurality of first network switches is $d^2$, and a number of the second plurality of second network switches is a sum of $d(d-1)/2$ and an integer to which $d/2$ is rounded up.

8. The parallel computer system of claim 7, wherein each network switch of the first plurality of first network switches is configured to:

receive data from a node directly connected to the each first network switch, transmit, when a destination node of the received data is directly connected to the each first network switch, the received data to the destination node of the received data, and transfer, when the destination node of the received data is not directly connected to the each first network switch, transfer the received data to one network switch of the second plurality of second network switches that connects the each first network switch and a destination first network switch that is a first network switch of the first plurality of first network switches directly connected to the destination node of the received data.

9. The parallel computer system of claim 7, wherein the plurality of nodes perform all-to-all communication among the plurality of nodes.

10. The parallel computer system of claim 7, wherein a consecutive node number is assigned to each node of the plurality of nodes, according to a predetermined connection relationship between the plurality of nodes and the plurality of network switches, a plurality of groups are set based on the predetermined connection relationship so that each node of the plurality of nodes belongs to one of the plurality of groups each assigned a different group number, each node of the plurality of nodes is configured to calculate a destination node number according to a calculation expression of $((s \% d)*d+(i+o) \% d+(i/d)*d) \% d^2+g$, where g is a group number assigned to a group to which the each node belongs, s is a node number assigned to the node performing the calculation, s being a positive integer equal to 1 or more, i is a number indicating a time and being a positive integer equal to 1 or more, o is a predetermined offset value that is determined based on the predetermined connection relationship and being a positive integer equal to 1 or more, and % is modulus operator, and each node determines, as the first destination node at time i, a node with the calculated destination node number.

11. The parallel computer system of claim 7, wherein each node of the plurality of nodes is connected to only one network switch of the plurality of network switches.

12. A method of controlling a parallel computer system including a plurality of network switches in which each network switch of the plurality of network switches is directly connected to each other network switch of the plurality of network switches and a plurality of nodes in which each node of the plurality of nodes is directly connected to only one network switch of the plurality of network switches, the each network switch of the plurality of network switches being directly connected to two or more nodes of the plurality of nodes, the method comprising:

determining, by each node of the plurality of nodes, a first destination node of data, to be transmitted by the node performing the determination, at a given time so that a first destination network switch is different from a second network switch, the first destination network switch being a network switch of the plurality of network switches directly connected to the first destination node, the second network switch being a network switch of the plurality of network switches directly connected to a second destination node of data transmitted by a source node of the plurality of nodes other than the node performing the determination, and the source node being directly connected to a source network switch that is a network switch of the plurality of network switches to which the node performing the determination is directly connected; and transmitting, by each node of the plurality of nodes, data to the determined first destination node, wherein a number of nodes directly connected to each network switch of the plurality of network switches is a predetermined number of d, d being a positive integer equal to 1 or more, a number of the plurality of network switches is the predetermined number of d, and a number of the plurality of nodes is $d^2$.

13. The method of claim 12, wherein each node of the plurality of nodes is connected to only one network switch of the plurality of network switches.

14. An information processing apparatus serving as one node of a plurality of nodes in which each node of the plurality of nodes is directly connected to only one network switch of a plurality of network switches, the one network switch of the plurality of network switches being directly connected to two or more nodes of the plurality of nodes, the information processing apparatus comprising:

a processor configured to:
   determine a first destination node of data, to be transmitted at a given time so that a first destination network switch is different from a second destination network switch, the first destination network switch being a network switch of the plurality of network switches directly connected to the first destination node, the second network switch being a network switch of the plurality of network switches directly connected to a second destination node of data transmitted by a source node of the plurality of nodes other than the one node, and the source node being directly connected to a source network switch that is a network switch of the plurality of network switches to which the one node is directly connected; and
   transmit data to the determined first destination node; and a memory coupled to the processor, the memory configured to store information identifying the information processing apparatus among the plurality of nodes, wherein a number of nodes directly connected to each network switch of the plurality of network switches is a predetermined number of d, d being a positive integer equal to 1 or more, a number of the plurality of network switches is the predetermined number of d, and a number of the plurality of nodes is $d^2$.

15. The information processing apparatus of claim 14, wherein each node of the plurality of nodes is connected to only one network switch of the plurality of network switches.

16. A method of controlling a parallel computer system including a first plurality of first network switches, a second plurality of second network switches, and a plurality of nodes in which each node of the plurality of nodes is directly connected to only one network switch of the first plurality of first network switches, the method comprising:

directly connecting each node of the plurality of nodes to only one network switch of the first plurality of first network switches;

directly connecting each network switch of the second plurality of second network switches to at least two network switches out of the first plurality of first network switches;

directly connecting two or more nodes of the plurality of nodes to each network switch of the first plurality of first network switches;

connecting any two network switches out of the first plurality of first network switches via one network switch of the second plurality of second network switches;

determining, by each node of the plurality of nodes, a first destination node of data, to be transmitted by the node performing the determination, at a given time so that a first destination network switch is different from a second network switch, the first destination network switch being a network switch of the first plurality of first network switches directly connected to the first destination node, the second network switch being a network switch of the first plurality of first network switches directly connected to a second destination node of data transmitted by a source node of the plurality of nodes other than the node performing the determination, and the source node being directly connected to a source network switch that is a network switch of the first plurality of first network switches to which the node performing the determination is directly connected; and transmitting, by the node of the plurality of nodes, data to the determined first destination node, wherein a number of nodes directly connected to each network switch of the plurality of network switches is a predetermined number of d, d being a positive integer equal to 1 or more, a number of the plurality of nodes is $d^3$, a number of the plurality of first network switches is $d^2$, and a number of the second plurality of second network switches is a sum of $d(d-1)/2$ and an integer to which $d/2$ is rounded up.

17. The method of claim 16, wherein the connecting each node of the plurality of nodes to one network switch of the plurality of first network switches comprises connecting each node of the plurality of nodes to only one network switch of the plurality of first network switches.

* * * * *